United States Patent
Reichenbach-Klinke et al.

(10) Patent No.: US 9,163,103 B2
(45) Date of Patent: Oct. 20, 2015

(54) HYDROPHOBICALLY ASSOCIATING COPOLYMERS

(71) Applicants: Roland Reichenbach-Klinke, Traunstein (DE); Thomas Pfeuffer, Haβfurt (DE); Kati Schmidt, Shanghai (CN); Thomas Ostrowski, Mannheim (DE); Reinhold J. Leyrer, Dannstadt-Schauernheim (DE); Yulia Fogel, Traunstein (DE); Stefan Friedrich, Garching (DE); Peter Gaeberlein, Magdeburg (DE); Andrea Orleans, Trostberg (DE); Manfred Schuhbeck, Traunstein (DE); Marcus Guzmann, Mühlhausen (DE); Marcus Rösch, Oppenheim (DE); Bjorn Langlotz, Trostberg (DE)

(72) Inventors: Roland Reichenbach-Klinke, Traunstein (DE); Thomas Pfeuffer, Haβfurt (DE); Kati Schmidt, Shanghai (CN); Thomas Ostrowski, Mannheim (DE); Reinhold J. Leyrer, Dannstadt-Schauernheim (DE); Yulia Fogel, Traunstein (DE); Stefan Friedrich, Garching (DE); Peter Gaeberlein, Magdeburg (DE); Andrea Orleans, Trostberg (DE); Manfred Schuhbeck, Traunstein (DE); Marcus Guzmann, Mühlhausen (DE); Marcus Rösch, Oppenheim (DE); Bjorn Langlotz, Trostberg (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 14/323,324

(22) Filed: Jul. 3, 2014

(65) Prior Publication Data

US 2014/0316035 A1    Oct. 23, 2014

Related U.S. Application Data

(60) Continuation of application No. 13/680,528, filed on Nov. 19, 2012, now Pat. No. 8,783,356, which is a division of application No. 12/783,877, filed on May 20, 2010, now Pat. No. 8,362,180.

(60) Provisional application No. 61/179,743, filed on May 20, 2009.

(51) Int. Cl.

| | | |
|---|---|---|
| C04B 24/26 | (2006.01) |
| C04B 24/38 | (2006.01) |
| C08F 220/58 | (2006.01) |
| C08F 220/26 | (2006.01) |
| C08F 220/56 | (2006.01) |
| C08F 228/02 | (2006.01) |
| C08F 230/02 | (2006.01) |
| C09K 8/588 | (2006.01) |
| E21B 43/16 | (2006.01) |
| C04B 16/04 | (2006.01) |
| C08F 220/60 | (2006.01) |
| C04B 103/00 | (2006.01) |

(52) U.S. Cl.
CPC .............. *C08F 220/58* (2013.01); *C04B 16/04* (2013.01); *C08F 220/26* (2013.01); *C08F 220/56* (2013.01); *C08F 220/60* (2013.01); *C08F 228/02* (2013.01); *C08F 230/02* (2013.01); *C09K 8/588* (2013.01); *E21B 43/16* (2013.01); *C04B 2103/0052* (2013.01); *C04B 2103/0053* (2013.01); *C08F 2220/585* (2013.01)

(58) Field of Classification Search
None
See application file for complete search history.

(56) References Cited

U.S. PATENT DOCUMENTS

| | | | |
|---|---|---|---|
| 3,739,848 A | 6/1973 | Lawson et al. |
| 4,917,615 A | 4/1990 | Franks, Jr. |
| 5,086,142 A * | 2/1992 | Fock et al. ................ 526/318 |
| 6,391,923 B1 | 5/2002 | Pollmann et al. |
| 6,672,547 B1 | 1/2004 | Westerberg et al. |
| 8,030,569 B2 | 10/2011 | Nakata |
| 8,526,200 B2 | 9/2013 | Miller et al. |
| 8,752,624 B2 | 6/2014 | Reichenbach-Klinke et al. |
| 8,763,698 B2 | 7/2014 | Reichenbach-Klinke et al. |
| 2012/0125643 A1 | 5/2012 | Langlotz et al. |
| 2012/0129734 A1 | 5/2012 | Reichenbach-Klinke et al. |
| 2012/0129739 A1 | 5/2012 | Pfeuffer et al. |
| 2012/0132420 A1 | 5/2012 | Langlotz et al. |

FOREIGN PATENT DOCUMENTS

| | | |
|---|---|---|
| DE | 3925220 C1 | 1/1991 |
| DE | 4325237 A1 | 2/1995 |
| DE | 100 37 629 A1 | 2/2002 |
| DE | 10 2004 032 304 A1 | 2/2006 |
| DE | 10 2006 050 761 A1 | 5/2008 |
| EP | 0013836 A1 | 8/1980 |
| EP | 705 854 A1 | 4/1996 |
| EP | 1069139 A2 | 1/2001 |
| JP | 3023349 U | 4/1996 |
| JP | 2000-119699 A | 4/2000 |
| JP | 2001-199751 A | 7/2001 |
| JP | 2004026468 A1 | 1/2004 |
| WO | WO-2004026468 A1 | 4/2004 |

(Continued)

OTHER PUBLICATIONS

International Search Report for PCT/EP2010/056685, mailed Mar. 30, 2011.

(Continued)

*Primary Examiner* — Vu A Nguyen
(74) *Attorney, Agent, or Firm* — Drinker Biddle & Reath LLP

(57) ABSTRACT

Water-soluble, hydrophobically associating copolymers which comprise new types of hydrophobically associating monomers. The monomers comprise an ethylenically unsaturated group and a polyether group with block structure comprising a hydrophilic polyalkylene oxide block which consists essentially of ethylene oxide groups, and a terminal, hydrophobic polyalkylene oxide block which consists of alkylene oxides with at least 4, preferably at least 5 carbon atoms.

19 Claims, No Drawings

(56) References Cited

FOREIGN PATENT DOCUMENTS

| | | |
|---|---|---|
| WO | WO-2004044035 A1 | 5/2004 |
| WO | WO-2009/019225 A2 | 2/2009 |

OTHER PUBLICATIONS

STN Search of Feb. 29, 2012.
STN Search of Mar. 1, 2012.

* cited by examiner

HYDROPHOBICALLY ASSOCIATING COPOLYMERS

CROSS REFERENCE TO RELATED APPLICATIONS

This application is a continuation application of and claims benefit to U.S. patent application Ser. No. 13/680,528, filed Nov. 19, 2012 which is a divisional application of and claims benefit to U.S. patent application Ser. No. 12/783,877, filed May 20, 2010, now issued U.S. Pat. No. 8,362,180 which claims benefit to U.S. Provisional Application No. 61/179,743, filed May 20, 2009, which are hereby incorporated by reference in their entirety.

The present invention relates to water-soluble, hydrophobically associating copolymers which comprise new types of hydrophobically associating monomers. The monomers comprise an ethylenically unsaturated group and a polyether group with block structure comprising a hydrophilic polyalkylene oxide block, which consists essentially of ethylene oxide groups, and a terminal, hydrophobic polyalkylene oxide block, which consists of alkylene oxides having at least 4 carbon atoms, preferably at least 5 carbon atoms.

Water-soluble, thickening polymers are used in many areas of technology, for example in the area of cosmetics, in foods, for the production of cleaners, printing inks, emulsion paints and in the recovery of mineral oil.

Many chemically different classes of polymers are known which can be used as thickeners. An important class of thickening polymers is the so-called hydrophobically associating polymers. This is understood by the person skilled in the art as meaning water-soluble polymers which have lateral or terminal hydrophobic groups, such as, for example, relatively long alkyl chains. In aqueous solution, such hydrophobic groups can associate with themselves or with other substances having hydrophobic groups. As a result of this, an associative network is formed, through which the medium is thickened.

EP 705 854 A1, DE 100 37 629 A1 and DE 10 2004 032 304 A1 disclose water-soluble, hydrophobically associating copolymers and their use, for example in the construction chemistry sector. The described copolymers comprise acidic monomers, such as, for example, acrylic acid, vinylsulfonic acid, acrylamidomethylpropanesulfonic acid, basic monomers, such as acrylamide, dimethylacrylamide, or monomers comprising cationic groups, such as, for example, monomers having ammonium groups. Monomers of this type impart water solubility to the polymers. As hydrophobically associating monomers, the disclosed copolymers in each case comprise monomers of the following type: $H_2C=C(R^x)-COO-(-CH_2-CH_2-O-)_q-R^y$ or else $H_2C=C(R^x)-O-(-CH_2-CH_2-O-)_q-R^y$, where $R^x$ is typically H or $CH_3$ and $R^y$ is a relatively large hydrocarbon radical, typically hydrocarbon radicals having 8 to 40 carbon atoms. Relatively long alkyl groups or else a tristyrylphenyl group are mentioned, for example, in the specifications.

A further important class of hydrophobically associating copolymers are alkali-soluble dispersions, as are disclosed, for example, by EP 13 836 A1 or WO 2009/019225. Dispersions of this type comprise on the one hand acidic monomers, in particular acrylic acid, the already mentioned hydrophobically associating monomers and also nonhydrophilic monomers, such as, for example, alkyl acrylates. Copolymers of this type are present in the acidic pH range as dispersion, but form a solution in the alkaline pH range and thus develop their thickening effect.

Polymers which have polyethylene oxide blocks, blocks of higher alkylene oxides and additionally ethylenically unsaturated groups are also known from other areas of technology.

WO 2004/044035 A1 discloses polyoxyalkylene block copolymers with a block comprising polystyrene oxide which can be used as emulsifiers for the preparation of dispersions. The examples disclose compounds in which allyl alcohol or hydroxybutyl vinyl ether is firstly provided with a polystyrene oxide group and then with a polyethylene oxide group as terminal group. The terminal group can optionally also be further functionalized, for example with acid groups. The described block copolymer is used for the preparation of styrene-acrylate dispersions.

WO 2004/026468 A1 discloses block copolymers comprising an alkylene oxide block, a block of glycidyl ethers and also an alkylene oxide block, where the block copolymers have an ethylenically unsaturated head group. The terminal group can additionally be functionalized with acid groups. The block copolymers are used as polymerizable emulsifiers. The use for the preparation of water-soluble, hydrophobically associating copolymers is not mentioned.

EP 1 069 139 A2 discloses aqueous dispersions which are obtained by polymerization of ethylenically unsaturated water-insoluble compounds in the presence of a water-soluble allyl or vinyl ether. The allyl or vinyl ethers have a polyalkylene oxide group which is formed from $C_2$-$C_4$-alkylene oxides, where ethylene oxide units must obligatorily be present. The alkylene oxide units can be arranged randomly or blockwise, and the polyalkylene oxide group can have H or a $C_1$ to $C_4$ group as terminal group. The examples specifically mention polyethylene oxide-b-polypropylene oxide-monobutyl vinyl ether.

JP 2001-199751 A discloses the preparation of a dispersant for cement. Here, maleic anhydride is copolymerized with a macromonomer. The macromonomer is a polyoxyalkylene block copolymer comprising a polyethylene oxide block and a block of an alkylene oxide selected from the group of propylene oxide, butylene oxide or styrene oxide, the terminal OH groups being etherified with a $C_2$- to $C_5$-alkenyl group or with a $C_1$-$C_5$-alkyl group.

JP 2000-119699 A discloses a deinking auxiliary in the reprocessing of wastepaper. For this, a polyoxyalkylene block copolymer is used which has a terminal $C_8$- to $C_{24}$-alkyl or alkenyl group which is joined to an ethylene oxide-propylene oxide block, a polyethylene oxide block and also a block comprising propylene oxide or higher alkylene oxides. The preparation of polymers starting from this block copolymer is not described.

It is known to use hydrophobically associating copolymers in the field of mineral oil recovery, in particular for enhanced oil recovery (EOR). Details on using hydrophobically associating copolymers for enhanced oil recovery are described, for example, in the overview article by Taylor, K. C. and Nasr-El-Din, H. A. in J. Petr. Sci. Eng. 1998, 19, 265-280.

The techniques of enhanced oil recovery include "polymer flooding". A mineral oil deposit is not a subterranean "sea of mineral oil", but the mineral oil is held in the tiny pores of the mineral oil-conveying rock. The diameter of the cavities in the formation is usually only a few micrometers. For the polymer flooding, an aqueous solution of a thickening polymer is injected into a mineral oil deposit through injection bores. By injecting in the polymer solution, the mineral oil is forced through said cavities in the formation starting from the injection bore in the direction of the production bore, and the mineral oil is recovered via the production bore. It is important for this application that the aqueous polymer solution contains no gel particles at all. Even small gel particles with dimensions in the micrometer range can block the fine pores in the formation and thus bring the mineral oil recovery to a standstill. Hydrophobically associating copolymers for enhanced oil recovery should therefore have the lowest possible fraction of gel particles.

The aforementioned monomers $H_2C=C(R^x)-COO-(-CH_2-CH_2-O-)_q-R^y$ and $H_2C=C(R^x)-O-(-CH_2-CH_2-O-)_q-R^y$ are usually prepared by means of a two-stage process. In a first stage, an alcohol R—OH is ethoxylated, giving an ethoxylated alcohol of the general formula $HO-(-CH_2-CH_2-O-)_q-R^y$. This can be reacted in a second stage with (meth)acrylic anhydride or acetylene to give the specified monomers. As a by-product of the first stage (i.e. of the ethoxylation of the alcohol), polyethylene oxide $HO-(-CH_2-CH_2-O)_q-H$ is formed in small amounts. In the second stage, the difunctional molecules $H_2C=C(R^x)-COO-(-CH_2-CH_2-O-)_q-OC-C(R^x)=CH_2$ or $H_2C=C(R^x)-O-(-CH_2-CH_2-O-)_q-C(R^x)=CH_2$ can be formed therefrom. Since purification is extremely complex, these by-products are usually not separated off. Difunctional molecules of this type have a crosslinking effect and consequently lead in the course of a polymerization to the formation of crosslinked products. As a result of this, the formed polymers automatically have certain gel fractions which are extremely troublesome when using the polymers for EOR. Furthermore, for reasons of cost, it is in any case desirable to provide the simplest possible method for the preparation of the monomers.

It was therefore an object of the invention to provide hydrophobically associating copolymers with low gel fractions. Furthermore, the copolymers should be able to be prepared more economically than hitherto.

Correspondingly, water-soluble, hydrophobically associating copolymers have been found which comprise at least the following monomers:
(a) 0.1 to 20% by weight of at least one monoethylenically unsaturated, hydrophobically associating monomer (a), and
(b) 25% by weight to 99.9% by weight of at least one monoethylenically unsaturated hydrophilic monomer (b) different therefrom,
where the quantitative data are based in each case on the total amount of all of the monomers in the copolymer, and where at least one of the monomers (a) is a monomer of the general formula (I)

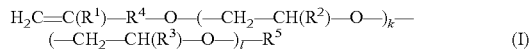

where the units $-(-CH_2-CH(R^2)-O-)_k-$ and $-(-CH_2-CH(R^3)-O-)_l-$ are arranged in block structure in the order shown in formula (I) and the radicals and indices have the following meaning:

k: a number from 10 to 150,
l: a number from 5 to 25,
$R^1$: H or methyl,
$R^2$: independently of one another, H, methyl or ethyl, with the proviso that at least 50 mol % of the radicals $R^2$ are H,
$R^3$: independently of one another, a hydrocarbon radical having at least 2 carbon atoms or an ether group of the general formula $-CH_2-O-R^{3'}$, where $R^{3'}$ is a hydrocarbon radical having at least 2 carbon atoms,
$R^4$: a single bond or a divalent linking group selected from the group of $-(C_nH_{2n})-[R^{4a}]$, $-O-(C_nH_{2n'})-[R^{4b}]$ and $-C(O)-O-(C_{n''}H_{2n''})-[R^{4c}]$, where n, n' and n" is in each case a natural number from 1 to 6, $R^5$: H or a hydrocarbon radical having 1 to 30 carbon atoms.

Furthermore, the use of such copolymers for the development, exploitation and completion of subterranean mineral oil deposits and natural gas deposits, as additive for aqueous construction systems which comprise hydraulic binder systems and for the production of liquid detergents and cleaners has been found, as well as compositions of the copolymers preferred for the respective use.

Regarding the invention, the details are as follows:

The hydrophobically associating copolymers according to the invention are water-soluble copolymers which have hydrophobic groups. In aqueous solution, the hydrophobic groups are able to associate with themselves or with substances having other hydrophobic groups and, through this interaction, thicken the aqueous medium.

It is known to the person skilled in the art that the solubility of hydrophobically associating (co)polymers in water can be more or less dependent on the pH depending on the type of monomers used. A reference point for assessing the solubility in water should in each case therefore be the pH desired for the respective intended use of the copolymer. A copolymer which, at a certain pH, has an inadequate solubility for the intended use may have an adequate solubility at a different pH. The term "water-soluble" encompasses in particular also alkali-soluble dispersions of polymers, i.e. polymers which are present in the acidic pH range as dispersions and dissolve in water and develop their thickening effect only in the alkaline pH range.

In an ideal case, the copolymers according to the invention should be miscible with water in any desired ratio. According to the invention, however, it is sufficient if the copolymers are water-soluble at least at the desired use concentration and at the desired pH. As a rule, the solubility in water at room temperature should be at least 20 g/l, preferably at least 50 g/l and particularly preferably at least 100 g/l.

Besides the hydrophobic groups already mentioned, the hydrophobically associating copolymers according to the invention therefore comprise hydrophilic groups in an amount such that the described water solubility is ensured at least in the pH range intended for the respective application.

Monomer (a)

The hydrophobically associating copolymer according to the invention comprises at least one monoethylenically unsaturated monomer (a) which imparts hydrophobically associating properties to the copolymer according to the invention and is therefore referred to below as hydrophobically associating monomer.

Monomer (a) of the Formula (I)

According to the invention, at least one of the monoethylenically unsaturated monomers (a) is a monomer of the general formula

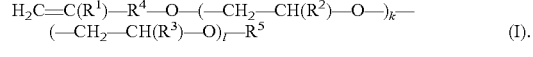

In the monomers (a) of the formula (I), an ethylenic group $H_2C=C(R^1)-$ is bonded via a divalent, linking group $-R^4-O-$ to a polyoxyalkylene radical with block structure $-(-CH_2-CH(R^2)-O-)_k-(-CH_2-CH(R^3)-O-)_l-R^5$ where the two blocks $-(-CH_2-CH(R^2)-O-)_k$ and $-(-CH_2-CH(R^3)-O-)_l-$ are arranged in the order shown in formula (I). The polyoxyalkylene radical has either a terminal OH group or a terminal ether group $-OR^5$.

In the aforementioned formula, $R^1$ is H or a methyl group.

$R^4$ is a single bond or a divalent, linking group, selected from the group of $-(C_nH_{2n})-[group\ R^{4a}]$, $-O-(C_nH_{2n'})-[group\ R^{4a}]-$ and $-C(O)-O-(C_{n''}H_{2n''})-[group\ R^{4c}]$. In the specified formulae, n, n' and n" are in each case a natural number from 1 to 6. In other words, the linking group is straight-chain or branched aliphatic hydrocarbon groups having 1 to 6 hydrocarbon atoms which are linked to the ethylenic group $H_2C=C(R^1)$— either directly, via an ether group —O— or via an ester group —C(O)—O—. The groups —$(C_nH_{2n})$—, —$(C_nH_{2n'})$— and —$(C_{n''}H_{2n''})$— are preferably linear aliphatic hydrocarbon groups.

Preferably, the group $R^{4a}$ is a group selected from —$CH_2$—, —$CH_2$—$CH_2$— and —$CH_2$—$CH_2$—$CH_2$—, and is particularly preferably a methylene group —$CH_2$—.

Preferably, the group $R^{4b}$ is a group selected from —O—$CH_2$—$CH_2$—, —O—$CH_2$—$CH_2$—$CH_2$— and —O—$CH_2$—$CH_2$—$CH_2$—$CH_2$—, and is particularly preferably —O—$CH_2$—$CH_2$—$CH_2$—$CH_2$—.

Preferably, the group $R^{4c}$ is a group selected from —C(O)—O—$CH_2$—$CH_2$—, —C(O)O—$CH(CH_3)$—$CH_2$—, —C(O)O—$CH_2$—$CH(CH_3)$—, —C(O)O—$CH_2$—$CH_2$—$CH_2$— and —C(O)O—$CH_2$—$CH_2$—$CH_2$—$CH_2$—$CH_2$—$CH_2$—, particular preference being given to —C(O)—O—$CH_2$—$CH_2$— and —C(O)O—$CH_2$—$CH_2$—$CH_2$— and very particular preference being given to —C(O)—O—$CH_2$—$CH_2$—.

The group $R^4$ is particularly preferably a group $R^{4a}$ or $R^{4b}$, particularly preferably a group $R^{4b}$.

Furthermore, $R^4$ is particularly preferably a group selected from —$CH_2$— or —O—$CH_2$—$CH_2$—$CH_2$—$CH_2$—, and is very particularly preferably —O—$CH_2$—$CH_2$—$CH_2$—$CH_2$—.

Furthermore, the monomers (I) have a polyoxyalkylene radical which consists of the units —$(-CH_2-CH(R^2)-O-)_k$ and —$(-CH_2-CH(R^3)-O-)_l$, where the units are arranged in block structure in the order shown in formula (I). The transition between the two blocks may be abrupt or continuous.

In the block —$(-CH_2-CH(R^2)-O-)_k$, the radicals $R^2$, independently of one another, are H, methyl or ethyl, preferably H or methyl, with the proviso that at least 50 mol % of the radicals $R^2$ are H. Preferably, at least 75 mol % of the radicals $R^2$ are H, particularly preferably at least 90 mol % and very particularly preferably exclusively H. In the specified block, a polyoxyethylene block which can optionally still have certain fractions of propylene oxide and/or butylene oxide units is thus preferably a pure polyoxyethylene block.

The number of alkylene oxide units k is a number from 10 to 150, preferably 12 to 100, particularly preferably 15 to 80, very particularly preferably 20 to 30 and for example ca. 22 to 25. For the person skilled in the art in the field of polyalkylene oxides, it is clear that the specified numbers are average values of distributions.

In the second, terminal block —$(-CH_2-CH(R^3)-O-)_l$, the radicals $R^3$, independently of one another, are hydrocarbon radicals of at least 2 carbon atoms, preferably, at least 3 and particularly preferably 3 to 10 carbon atoms. These may be an aliphatic and/or aromatic, linear or branched carbon radical. These are preferably aliphatic radicals.

Examples of suitable radicals $R^3$ comprise ethyl, n-propyl, n-butyl, n-pentyl, n-hexyl, n-heptyl, n-octyl, n-nonyl or n-decyl and also phenyl. Examples of preferred radicals comprise n-propyl, n-butyl, n-pentyl and particular preference is given to an n-propyl radical.

The radicals $R^3$ may also be ether groups of the general formula —$CH_2$—O—$R^{3'}$, where $R^{3'}$ is an aliphatic and/or aromatic, linear or branched hydrocarbon radical having at least 2 carbon atoms, preferably at least 3 and particularly preferably 3 to 10 carbon atoms. Examples of radicals $R^{3'}$ comprise n-propyl, n-butyl, n-pentyl, n-hexyl, 2-ethylhexyl, n-heptyl, n-octyl, n-nonyl, n-decyl or phenyl.

The block —$(-CH_2-CH(R^3)-O-)_l$— is thus a block which consists of alkylene oxide units having at least 4 carbon atoms, preferably at least 5 carbon atoms, and/or glycidyl ethers with an ether group of at least 2, preferably at least 3 carbon atoms. Preferably, the radicals $R^3$ are the specified hydrocarbon radicals; the building blocks of the second terminal block are particularly preferably alkylene oxide units comprising at least 5 carbon atoms, such as pentene oxide units or units of higher alkylene oxides.

The number of alkylene oxide units l is a number from 5 to 25, preferably 6 to 20, particularly preferably 8 to 18, very particularly preferably 10 to 15 and for example ca. 12.

The radical $R^5$ is H or a preferably aliphatic hydrocarbon radical having 1 to 30 carbon atoms, preferably 1 to 10 and particularly preferably 1 to 5 carbon atoms. Preferably, $R^5$ is H, methyl or ethyl, particularly preferably H or methyl and very particularly preferably H.

In the monomers of the formula (I), a terminal, monoethylenic group is thus linked to a polyoxyalkylene group with block structure, and specifically firstly to a hydrophilic block having polyethylene oxide units and this in turn to a second terminal, hydrophobic block which is composed of at least of butene oxide units, preferably at least pentene oxide units or units of higher alkylene oxides, such as, for example, dodecene oxide. The second block has a terminal —$OR^5$ group, in particular an OH group. In contrast to the hydrophobically associating copolymers known from the prior art, the end group does not have to be etherified with a hydrocarbon radical for the hydrophobic association, but the terminal block —$(-CH_2-CH(R^3)-O-)_l$ itself with the radicals $R^3$ is responsible for the hydrophobic association of the copolymers prepared using the monomers (a). The etherification is only one option which can be selected by the person skilled in the art depending on the desired properties of the copolymer.

For the person skilled in the art in the field of polyalkylene oxide block copolymers, it is clear that the transition between the two blocks can be abrupt or continuous depending on the type of preparation. In the case of a continuous transition, between the two blocks, there is also a transition zone which comprises monomers of the two blocks. If the block limit is fixed in the middle of the transition zone, correspondingly the first block —$(-CH_2-CH(R^2)-O-)_k$ can still have small amounts of units —$CH_2$—$CH(R^3)$—O— and the second block —$(-CH_2-CH(R^3)-O-)_l$ can have small amounts of units —$CH_2$—$CH(R^2)$—O—, although these units are not distributed randomly over the block, but are arranged in said transition zone.

Preparation of the Monomers (a) of the Formula (I)

The preparation of the hydrophobically associating monomers (a) of the formula (I) can take place in accordance with methods known in principle to the person skilled in the art.

In one preferred preparation process the preparation of the monomers (a) starts from suitable monoethylenically unsaturated alcohols (III) which are then alkoxylated in a two-stage process, so that the block structure mentioned is obtained. Monomers (a) of the formula (I) where $R^5$=H are obtained. The latter may optionally be etherified in a further process step.

The type of ethylenically unsaturated alcohols (III) to be used is governed here in particular by the group $R^4$.

If $R^4$ is a single bond, the starting materials are alcohols (III) of the general formula $H_2C=C(R^1)$—O—$(-CH_2-CH(R^{2'})-O-)_d$—H (IIIa), where $R^1$ has the meaning defined above, $R^{2'}$ is H and/or $CH_3$, preferably H and d is a number from 1 to 5, preferably 1 or 2. Examples of such alcohols comprise diethylene glycol vinyl ether $H_2C=CH-O-CH_2-CH_2-O-CH_2-CH_2-OH$ or dipropylene glycol vinyl ether $H_2C=CH-O-CH_2-CH(CH_3)-O-CH_2-CH(CH_3)-OH$, preference being given to diethylene glycol vinyl ether.

For the preparation of monomers (a) in which $R^4$ is not a single bond, it is possible to use alcohols of the general formula $H_2C=C(R^1)-R^4-OH$ (IIIa) or even alcohols having alkoxy groups of the formula $H_2C=C(R^1)-R^4-O-(-CH_2-CH(R^{2'})-O-)_d-H$ (IIIb), where $R^{2'}$ and d have the meaning defined above, and $R^4$ is in each case selected from the group $R^{4a}$, $R^{4b}$ and $R^{4c}$.

For the preparation of the monomers with linking group $R^{4a}$, preference is given to starting from alcohols of the formula $H_2C=C(R^1)-(C_nH_{2n})-OH$, in particular $H_2C=CH-(C_nH_{2n})-OH$ or alcohols of the formula $H_2C=C(R^1)-O-(-CH_2-CH(R^2)-O-)_d-H$, in particular those where $R^1$=H and $R^2$=H and/or $CH_3$. Examples of preferred alcohols comprise allyl alcohol $H_2C=CH-CH_2-OH$ or isoprenol $H_2C=C(CH_3)-CH_2-CH_2-OH$.

For the preparation of the monomers with linking group $R^{4b}$, the starting materials are vinyl ethers of the formula $H_2C=C(R^1)-O-(C_nH_{2n'})-OH$, preferably $H_2C=CH-O-(C_nH_{2n'})-OH$. Particularly preferably, ω-hydroxybutyl vinyl ether $H_2C=CH-O-CH_2-CH_2-CH_2-CH_2-OH$ can be used.

For the preparation of the monomers with linking group $R^{4c}$, the starting materials are hydroxyalkyl(meth)acrylates of the general formula $H_2C=C(R^1)-C(O)-O-(C_{n''}H_{2n''})-OH$, preferably $H_2C=C(R^1)-C(O)-O-(C_{n''}H_{2n''})-OH$. Examples of preferred hydroxyalkyl(meth)acrylates comprise hydroxyethyl(meth)acrylate $H_2C=C(R^1)-C(O)-O-CH_2-CH_2-OH$ and also hydroxybutyl (meth)acrylate $H_2C=C(R^1)-C(O)-O-CH_2-CH_2-CH_2-CH_2-OH$.

The specified starting compounds are alkoxylated, and specifically in a two-stage process firstly with ethylene oxide, optionally in a mixture with propylene oxide and/or butylene oxide and in a second step with alkylene oxides of the general formulae (Xa) or (Xb)

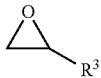
(Xa)

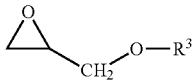
(Xb)

where $R^3$ in (Xa) or $R^{3'}$ in (Xb) has the meaning defined at the outset.

The procedure for an alkoxylation including the preparation of block copolymers from various alkylene oxides is known in principle to the person skilled in the art. It is likewise known to the person skilled in the art that it is possible to influence via the reaction conditions, in particular the choice of catalyst, the molecular weight distribution of the alkoxylates and the orientation of alkylene oxide units in a polyether chain.

The alkoxylates can be prepared, for example, by base catalyzed alkoxylation. For this, the alcohol used as starting material can be admixed in a pressurized reactor with alkali metal hydroxides, preferably potassium hydroxide, or with alcohol metal alcoholates, such as, for example, sodium methylate. Through a reduced pressure (for example <100 mbar) and/or elevation of the temperature (30 to 150° C.), water still present in the mixture can be stripped off. The alcohol is then in the form of the corresponding alcoholate. The system is then rendered inert with inert gas (e.g. nitrogen) and in a first step, ethylene oxide, optionally in the mixture with propylene oxide and/or butylene oxide, is added stepwise at temperatures of from 60 to 180° C., preferably 130 to 150°. The addition takes place typically over the course of 2 to 5 hours without the invention being limited thereto. When the addition is complete, the reaction mixture is expediently left to after-react, for example for ½ h to 1 h. In a second step, the alkylene oxides having at least 5 carbon atoms are then metered in stepwise. The reaction temperature in the second stage can be maintained or else altered. A ca. 10 to 25° C. lower reaction temperature than in the first stage has proven useful.

The alkoxylation can also be carried out using techniques which lead to narrower molecular weight distributions than in the case of the base-catalyzed synthesis. For this, double hydroxide clays as described in DE 43 25 237 A1, for example, can be used as catalyst. The alkoxylation can particularly preferably take place using double metal cyanide catalysts (DMC catalysts). Suitable DMC catalysts are disclosed, for example, in DE 102 43 361 A1, in particular sections [0029] to [0041] and the literature cited therein. For example, catalysts of the Zn—Co type can be used. To carry out the reaction, the alcohol used as starting material can be admixed with the catalyst, the mixture dewatered as described above and reacted with the alkylene oxides as described. Usually, not more than 250 ppm of catalyst with regard to the mixture are used, and, on account of this small amount, the catalyst can remain in the product.

The alkoxylation can furthermore also be carried out with acid catalysis. The acids may be Brönstedt acids or Lewis acids. To carry out the reaction, the alcohol used as starting material can be admixed with the catalyst, the mixture can be dewatered as described above and reacted with the alkylene oxides as described. At the end of the reaction, the acidic catalyst can be neutralized by adding a base, for example KOH or NaOH, and, if required, filtered off.

For the person skilled in the art in the field of polyalkylene oxides, it is clear that the orientation of the hydrocarbon radicals $R^3$ and, if appropriate, $R^2$ can depend on the conditions during the alkoxylation, for example on the catalyst selected for the alkoxylation. The alkylene oxide groups can thus be incorporated into the monomer either in the orientation $-(-CH_2-CH(R^3)-O-)$ or else in inverse orientation $-(-CH(R^3)-CH_2-O-)-$. The depiction in formula (I) should therefore not be regarded as limited to a certain orientation of the groups $R^2$ and/or $R^3$.

If the monomers (a) of the formula (I) with a terminal OH group (i.e. $R^5$=H) obtained as described are to be optionally etherified, this can take place with customary alkylating agents known in principle to the person skilled in the art, for example alkyl sulfates. For the etherification, in particular dimethyl sulfate or diethyl sulfate can be used.

The described preferred preparation process for the monomers (I) also differs, including in cases when $R^5$ is not H, fundamentally from the synthesis of known hydrophobically associating monomers by the series of synthesis steps: whereas in the case of the synthesis processes for the synthesis of the known hydrophobically associating monomers mentioned at the outset, the starting material used is an alcohol, which is alkoxylated and only at the end is a compound with an ethylenically unsaturated group reacted with the alkoxylated alcohol, in the case of the synthesis variant described according to the invention, the procedure is reversed: starting material is an ethylenically unsaturated compound which is alkoxylated and can then be optionally etherified. This prevents the formation of crosslinking by-products, meaning that the preparation of copolymers with a particularly low gel fraction is possible.

Further Monomers (a)

Besides the monomers (I), it is also possible optionally to use monoethylenic, hydrophobically associating monomers (a) different from the monomers (I). Further monomers (a) have the general formula $H_2C=C(R^1)-Y-Z$, where $R^1$ is H or methyl, Z is a terminal hydrophobic group and Y is a linking hydrophilic group. The person skilled in the art is aware of such monomers and makes a suitable selection as appropriate. Examples of such monomers comprise in particular monomers of the general formula $H_2C=C(R^1)-COO-(-CH_2-CH(R^6)-O-)_q-R^7$ (IIa) or $H_2C=C(R^1)-O-(-CH_2-CH(R^6)-O-)_q-R^7$ (IIb), where q is a number from 10 to 150, preferably 12 to 100, particularly preferably 15 to 80, very particularly preferably 20 to 30 and for example ca. 25, $R^1$ is as defined above and the radicals $R^6$, independently of one another, are H, methyl or ethyl, preferably H or methyl, with the proviso that at least 50 mol % of the radicals $R^6$ are H. Preferably, at least 75 mol % of the radicals $R^6$ are H, particularly preferably at least 90 mol % and very particularly preferably exclusively H. The radical $R^7$ is an aliphatic and/or aromatic, straight-chain or branched hydrocarbon radical having at least 6 carbon atoms, in particular 6 to 40 carbon atoms, preferably 8 to 30 carbon atoms. Examples comprise n-alkyl groups, such as n-octyl, n-decyl or n-dodecyl groups, phenyl groups, and in particular substituted phenyl groups. The substituents on the phenyl groups may be alkyl groups, for example $C_1$- to $C_6$-alkyl groups, preferably styryl groups. Particular preference is given to a tristyrylphenyl group. The specified hydrophobically associating monomers of the formulae (IIa) and (IIb) are known in principle to the person skilled in the art.

Amounts of the Monomers (a)

The amount of monoethylenically unsaturated, hydrophobically associating monomers (a) is governed by the respective intended use of the copolymer according to the invention and is generally 0.1 to 20% by weight, based on the total amount of all of the monomers in the copolymer, preferably 0.1 to 12% by weight. In a further preferred embodiment the amount is 0.5 to 20% by weight, particularly preferably 0.5 to 12% by weight.

If further monomers (a) are also used besides the monomers (a) of the formula (I), the monomers of the formula (I) should generally be used in an amount of at least 0.1% by weight with regard to the sum of all of the monomers in the copolymer, preferably at least 0.5% by weight. Furthermore, the fraction of monomers of the formula (I) should generally be at least 25% by weight with regard to the amount of all of the monomers (a), preferably at least 50% by weight, particularly preferably at least 75% by weight and particularly preferably only monomers of the formula (I) should be used as monomers (a).

Hydrophilic Monomers (b)

Besides the monomers (a), the hydrophobically associating copolymer according to the invention comprises at least one monoethylenically unsaturated, hydrophilic monomer (b) different therefrom. It is of course also possible to use mixtures of two or more different hydrophilic monomers (b).

Besides an ethylenic group, the hydrophilic monomers (b) comprise one or more hydrophilic groups. On account of their hydrophilicity, these impart adequate solubility in water to the copolymer according to the invention. The hydrophilic groups are in particular functional groups which comprise O and/or N atoms. They can, moreover, comprise in particular S and/or P atoms as heteroatoms.

The monomers (b) are particularly preferably miscible with water in any desired ratio, although it suffices for carrying out the invention that the hydrophobically associating copolymer according to the invention has the solubility in water mentioned at the start. Generally, the solubility of the monomers (b) in water at room temperature should be at least 100 g/l, preferably at least 200 g/l and particularly preferably at least 500 g/l.

Examples of suitable functional groups comprise carbonyl groups $>C=O$, ether groups $-O-$, in particular polyethylene oxide groups $-(CH_2-CH_2-O-)_n-$, where n is preferably a number from 1 to 200, hydroxy groups $-OH$, ester groups $-C(O)O-$, primary, secondary or tertiary amino groups, ammonium groups, amide groups $-O(O)-NH-$, carboxamide groups $-C(O)-NH_2$ or acid groups such as carboxyl groups $-COOH$, sulfonic acid groups $-SO_3H$, phosphonic acid groups $-PO_3H_2$ or phosphoric acid groups $-OP(OH)_3$.

Examples of preferred functional groups comprise hydroxy groups $-OH$, carboxyl groups $-COOH$, sulfonic acid groups $-SO_3H$, carboxamide groups $-C(O)-NH_2$, amide groups $-C(O)-NH-$, and polyethylene oxide groups $-(CH_2-CH_2-O-)_n-H$, where n is preferably a number from 1 to 200.

The functional groups can be attached directly to the ethylenic group, or else be bonded to the ethylenic group via one or more linking hydrocarbon groups.

The hydrophilic monomers (b) are preferably monomers of the general formula $H_2C=C(R^8)R^9$ (III), where $R^8$ is H or methyl and $R^9$ is a hydrophilic group or a group comprising one or more hydrophilic groups.

The groups $R^9$ are groups which comprise heteroatoms in an amount such that the solubility in water defined at the start is achieved.

Examples of suitable monomers (b) comprise monomers comprising acid groups, for example monomers comprising $-COOH$ groups, such as acrylic acid or methacrylic acid, crotonic acid, itatonic acid, maleic acid or fumaric acid, monomers comprising sulfonic acid groups, such as vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkylphosphonic acids.

Also to be mentioned are acrylamide and methacrylamide and also derivatives thereof, such as, for example, N-methyl (meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives can be hydrolyzed after polymerization to vinylamine units, vinyl esters to vinyl alcohol units.

Further examples comprise monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or compounds of the formula $H_2C=C(R^1)-COO-(-CH_2-CH(R^{10})-O-)_b-R^{11}$ (IVa) or $H_2C=C(R^1)-O-(-CH_2-CH(R^{10})-O-)_b-R^{11}$ (IVb), where $R^1$ is as defined above and b is a number from 2 to 200, preferably 2 to 100. The radicals $R^9$ are, independently of one another, H, methyl or ethyl, preferably H or methyl, with the proviso that at least 50 mol % of the radicals $R^9$ are H. Preferably, at least 75 mol % of the radicals $R^9$ are H, particularly preferably at least 90 mol % and very particularly preferably exclusively H. The radical $R^{11}$ is H, methyl or ethyl, preferably H or methyl. The individual alkylene oxide units can be arranged randomly or blockwise. In the case of a block copolymer, the transition between the blocks may be abrupt or gradual.

Suitable hydrophilic monomers (b) are also monomers having ammonium groups, in particular ammonium derivatives of N-(ω-aminoalkyl)(meth)acrylamides or ω-aminoalkyl(meth)acrylic esters.

In particular, the monomers (b) having ammonium groups may be compounds of the general formulae $H_2C=C(R^8)$—CO—$NR^{14}$—$R^{12}$—$NR^{13}_3{}^+X^-$ (Va) and/or $H_2C=C(R^8)$—COO—$R^{12}$—$NR^{13}_3{}^+X^-$ (Vb), where $R^8$ has the meaning given above, thus is H or methyl, $R^{12}$ is a preferably linear $C_1$-$C_4$-alkylene group and $R^{14}$ is H or a $C_1$-$C_4$-alkyl group, preferably H or methyl. The radicals $R^{13}$, independently of one another, are $C_1$-$C_4$-alkyl, preferably methyl, or a group of the general formula —$R^{15}$—$SO_3H$, where $R^{15}$ is a preferably linear $C_1$- to $C_4$-alkylene group or a phenylene group, with the proviso that generally not more than one of the substituents $R^{13}$ is a substituent having sulfonic acid groups. The three substituents $R^{13}$ are particularly preferably methyl groups, i.e. the monomer has a group —$N(CH_3)_3{}^+$. $X^-$ in the above formula is a monovalent anion, for example $Cl^-$. $X^-$ can of course also be a corresponding fraction of a polyvalent anion, although this is not preferred. Examples of suitable monomers (b) of the general formula (Va) or (Vb) comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

The aforementioned hydrophilic monomers can of course be used not only in the depicted acid or base form, but also in the form of corresponding salts. It is also possible to convert acidic or basic groups into corresponding salts after the formation of the polymer.

In one preferred embodiment of the invention, the copolymer according to the invention comprises at least one monomer (b) comprising acid groups. These are preferably monomers which comprise at least one group selected from the group of —COOH, —$SO_3H$ or —$PO_3H_2$, particular preference being given to monomers comprising COOH groups and/or —$SO_3H$ groups, where the acid groups may also be present completely or partially in the form of the corresponding salts.

Preferably, at least one of the monomers (b) is a monomer selected from the group of (meth)acrylic acid, vinylsulfonic acid, allylsulfonic acid or 2-acrylamido-2-methylpropanesulfonic acid (AMPS), particularly preferably acrylic acid and/or APMS or the salts thereof.

The amount of the monomers (b) in the copolymer according to the invention is 25 to 99.9% by weight, based on the total amount of all of the monomers in the copolymer, preferably 25 to 99.5% by weight. The exact amount is governed by the type and the desired intended use of the hydrophobically associating copolymers and is established accordingly by the person skilled in the art.

Monomers (c)

Apart from the hydrophilic monomers, the copolymers according to the invention can optionally comprise monoethylenically unsaturated monomers (c) different from the monomers (a) and (b). It is of course also possible to use mixtures of two or more different monomers (c).

The monomers (c) are in particular monomers which essentially have hydrophobic character and are water-soluble only to a small extent. Generally, the solubility of the monomers (c) in water at room temperature is less than 100 g/l, preferably less than 50 g/l and particularly preferably less than 20 g/l.

Examples of such monomers (c) comprise hydrocarbons, in particular styrene and hydrophobic derivatives, such as, for example, α-methylstyrene or alkylstyrenes, such as 4-methylstyrene or 4-ethylstyrene.

Preferably, the further monomers are those of the general formula $H_2C=C(R^{16})R^{17}$ (VI), where $R^{16}$ is H or methyl and $R^{17}$ is a further group which essentially has hydrophobic character.

$R^{17}$ is preferably carboxylic acid ester groups —$COOR^{18}$, where $R^{18}$ is a straight-chain or branched, aliphatic, cycloaliphatic and/or aromatic hydrocarbon radical having 1 to 30 carbon atoms, preferably 2 to 12 carbon atoms. They are particularly preferably an aliphatic, straight-chain or branched hydrocarbon radical having 2 to 10 carbon atoms.

Examples of such monomers (c) comprise esters of (meth) acrylic acid, for example alkyl(meth)acrylates, such as methyl(meth)acrylate, ethyl(meth)acrylate, n-propyl(meth)acrylate, n-butyl(meth)acrylate, 2-ethylhexyl acrylate or 2-propylheptyl acrylate.

$R^{16}$ may also be carboxamide groups —$CONHR^{17}$ or —$CON(R^{17})_2$, with the proviso that the number of carbon atoms in the radical $R^{18}$ or both radicals $R^{18}$ together is at least 3, preferably at least 4, where the two radicals $R^{18}$ together may also form a ring. Examples of such monomers comprise N-butyl(meth)acrylamide, N-cyclohexyl(meth)acrylamide or N-benzyl(meth)acrylamide.

The monomers (c) also include those monomers which do have hydrophilic groups besides hydrophobic groups, but in which the hydrophobic molecular moieties dominate, meaning that the monomers no longer have the required solubility in water and thus are not alone able to impart the required solubility to the polymer.

The type and amount of further monomers (c) is governed by the desired properties and the intended use of the copolymer and is 0 to 74.9% by weight, based on the total mount of all of the monomers in the copolymer, preferably 0 to 74.5% by weight.

Monomers (d)

In special cases, besides the monomers (a) and (b) and, if appropriate, (c), the copolymers according to the invention can optionally also comprise monomers (d) which have two or more, preferably two, ethylenically unsaturated groups. As a result of this, a certain crosslinking of the copolymer can be achieved provided that this has no undesired negative effects in the intended use of the copolymer. An excessively high degree of crosslinking, however, should in any case be avoided; in particular, the required solubility in water of the copolymer must not be impaired. Although slight crosslinking may be useful in individual cases, it is governed by the particular application of the copolymer and the person skilled in the art makes an appropriate choice.

Examples of suitable monomers (d) comprise 1,4-butanediol di(meth)acrylate, 1,6-hexanediol di(meth)acrylate, 1,3-butylene glycol di(meth)acrylate, neopentyl glycol di(meth) acrylate, ethylene glycol di(meth)acrylate, diethylene glycol di(meth)acrylate, triethylene glycol di(meth)acrylate or oligoethylene glycol di(meth)acrylates, such as, for example, polyethylene glycol bis(meth)acrylate, N,N'-methylenebis (meth)acrylamide, ethylene glycol divinyl ether, triethylene glycol divinyl ether, triallylamine, triallylamine methammonium chloride, tetraallylammonium chloride or tris(2-hydroxy)isocyanurate tri(meth)acrylate.

If present at all, crosslinking monomers (d) are only used in small amounts. Generally, the amount of the monomers (d) should not exceed 1% by weight with regard to the amount of all of the monomers used. Preferably, not more than 0.5% by weight and particularly preferably not more than 0.1% by weight should be used. Type and amount of the crosslinker are established by the person skilled in the art depending on the desired application of the copolymer.

Preparation of the Hydrophobically Associating Copolymers

The copolymers according to the invention can be prepared by methods known in principle to the person skilled in the art by free-radical polymerization of the monomers (a) and (b) and optionally (c) and/or (d), for example by bulk polymerization, solution polymerization, gel polymerization, emulsion polymerization, dispersion polymerization or suspension polymerization, preferably in aqueous phase.

The synthesis of the monomers (a) of the formula (I) used according to the invention are particularly preferably prepared by the preparation process described above by alkoxylation of alcohols (III), optionally followed by an etherification.

In one preferred embodiment, the preparation is carried out by means of gel polymerization in aqueous phase, provided all of the monomers used have adequate solubility in water. For the gel polymerization, firstly a mixture of the monomers, initiators and other auxiliaries is prepared with water for an aqueous solvent mixture. Suitable aqueous solvent mixtures comprise water and water-miscible organic solvents, where the fraction of water is generally at least 50% by weight, preferably at least 80% by weight and particularly preferably at least 90% by weight. Organic solvents to be mentioned here are in particular water-miscible alcohols such as methanol, ethanol or propanol. Acidic monomers can be completely or partially neutralized before the polymerization. Preference is given to a pH of ca. 4 to ca. 9. The concentration of all of the components with the exception of the solvents is usually ca. 25 to 60% by weight, preferably ca. 30 to 50% by weight.

The mixture is then polymerized photochemically and/or thermally, preferably at −5° C. to 50° C. If thermal polymerization is carried out, preference is given to using polymerization initiators which start even at a comparatively low temperature, such as, for example, redox initiators. The thermal polymerization can be carried out even at room temperature or by heating the mixture, preferably to temperatures of not more than 50° C. The photochemical polymerization is usually carried out at temperatures of from −5 to 10° C. Photochemical and thermal polymerization can particularly advantageously be combined with one another by adding to the mixture both initiators for the thermal and also for the photochemical polymerization. The polymerization is started in this case initially photochemically at low temperatures, preferably −5 to +10° C. As a result of the heat of reaction which is liberated, the mixture warms up and as a result of this the thermal polymerization is additionally started. By means of this combination it is possible to achieve a conversion of more than 99%.

The gel polymerization generally takes place without stirring. It can take place batchwise by irradiating and/or heating the mixture in a suitable vessel at a layer thickness of from 2 to 20 cm. The polymerization produces a solid gel. The polymerization can also be carried out continuously. For this, a polymerization apparatus is used which has a conveyor belt for receiving the mixture to be polymerized. The conveyor belt is equipped with devices for heating or for irradiation with UV radiation. Here, the mixture is poured using a suitable device at one end of the belt, the mixture is polymerized in the course of transportation in the belt direction and the solid gel can be removed at the other end of the belt.

After the polymerization, the gel is comminuted and dried. The drying should preferably take place at temperatures below 100° C. To avoid sticking together, a suitable separating agent can be used for this step. The hydrophobically associating copolymer is obtained as powder.

Further details for carrying out a gel polymerization are disclosed, for example, in DE 10 2004 032 304 A1, sections [0037] to [0041].

Copolymers according to the invention in the form of alkaline-soluble, aqueous dispersions can preferably be prepared by means of emulsion polymerization. The procedure for an emulsion polymerization using hydrophobically associating monomers is disclosed, for example, by WO 2009/019225 page 5, line 16 to page 8, line 13.

The copolymers according to the invention preferably have a number-average molecular weight $M_n$ of from 50000 to 20000000 g/mol.

Use of the Hydrophobically Associating Copolymers

The hydrophobically associating copolymers according to the invention can be used for thickening aqueous phases.

By selecting the type and amount of the monomers (a) and (b) and optionally (c) and/or (d) it is possible to adapt the properties of the copolymers to the particular technical requirements.

The use concentration is established by the person skilled in the art depending on the type of aqueous phase to be thickened and also on the type of copolymer. As a rule, the concentration of the copolymer is 0.1 to 5% by weight, with regard to the aqueous phase, preferably 0.5 to 3% by weight and particularly preferably 1 to 2% by weight.

The copolymers can be used here on their own or in combination with other thickening components, for example other thickening polymers. Furthermore, they can be formulated for example together with surfactants to give a thickening system. In aqueous solution, the surfactants can form micelles and, together with the micelles, the hydrophobically associating copolymers can form a three-dimensional, thickening network.

For use, the copolymer can be dissolved directly in the aqueous phase to be thickened. It is also conceivable to predissolve the copolymer and then to add the formed solution to the system to be thickened.

The aqueous phases to be thickened may be, for example, liquid detergent and cleaner formulations, such as, for example, detergents, washing auxiliaries such as, for example, pre-spotters, fabric softeners, cosmetic formulations, pharmaceutical formulations, foods, coating slips, formulations for the manufacture of textiles, textile printing pastes, printing inks, printing pastes for textile printing, paints, pigment slurries, aqueous formulations for foam generation, deicing mixtures, for example for aircraft, formulations for the construction industry, such as, for example, as additive for aqueous construction systems based on hydraulic binders such as cement, lime, gypsum and anhydrite and also in water-based paint and coating systems, formulations for the recovery of mineral oil, such as, for example, drilling fluids, formulations for the acidizing or fracturing or formulations for enhanced oil recovery.

Preferred Use and Copolymer (A1) Preferred for this

In one preferred embodiment of the invention, the hydrophobically associating copolymers according to the invention can be used for the development, exploitation and completion of subterranean mineral oil deposits and natural gas deposits.

The copolymers according to the invention can be used, for example, as additive to drilling fluids or during well cementing and also in particular for fracturing.

The copolymers are particularly preferably used for enhanced oil recovery, and specifically for so-called "polymer flooding". For this, an aqueous formulation is used which, besides water, comprises at least one hydrophobically associating copolymer. It is of course also possible to use mixtures of different copolymers. Moreover, further components can of course also be used. Examples of further components comprise biocides, stabilizers or inhibitors. The formulation can preferably be prepared by initially introducing the water and sprinkling in the copolymer as powder. The aqueous formulation should be subjected to the smallest possible shear forces.

The concentration of the copolymer should generally not exceed 5% by weight with regard to the sum of all of the constituents of the formulation and is usually 0.01 to 5% by weight, in particular 0.1 to 5% by weight, preferably 0.5 to 3% by weight and particularly preferably 1 to 2% by weight.

The formulation is injected through at least one injection bore into the mineral oil deposit, and crude oil is removed from the deposit through at least one production bore. In this connection, the term "crude oil" is of course intended to mean not only phase-pure oil, but the term also comprises the customary crude oil/water emulsions. A deposit is generally provided with a plurality of injection bores and with a plurality of production bores. As a result of the pressure generated by the injected formulation, the so-called "polymer flood", the mineral oil flows in the direction of the production bore and is recovered via the production bore. The viscosity of the flood medium should be adapted as far as possible to the viscosity of the mineral oil in the mineral oil deposit. The viscosity can be adjusted in particular via the concentration of the copolymer.

To increase the mineral oil yield, the polymer flooding can advantageously be combined with other techniques for enhanced oil recovery.

In one preferred embodiment of the invention, the "polymer flooding" using the hydrophobically associating copolymers according to the invention can be combined with a preceding, so-called "surfactant flooding". Here, before the polymer flooding, an aqueous surfactant formulation is initially injected into the mineral oil formation. As a result of this, the interfacial tension between the water of formation and the actual mineral oil is reduced, thereby increasing the mobility of the mineral oil in the formation. By combining the two techniques it is possible to increase the mineral oil yield.

Examples of suitable surfactants for the surfactant flooding comprise surfactants having sulfate groups, sulfonate groups, polyoxyalkylene groups, anionically modified polyoxyalkylene groups, betaine groups, glucoside groups or amine oxide groups, such as, for example, alkylbenzenesulfonates, olefinsulfonates or amidopropylbetaines. Preferably, anionic and/or betainic surfactants can be used.

The person skilled in the art is aware of the details for the technical procedure for the "polymer flooding" and of the "surfactant flooding", and will use an appropriate technique depending on the type of deposit.

It is of course also possible to use surfactants and the copolymers according to the invention in a mixture.

For the just mentioned preferred use for the development, exploitation and completion of subterranean mineral oil deposits and natural gas deposits, the copolymers described at the outset may be used. The copolymer described below can preferably be used. Accordingly, in one preferred embodiment, the invention relates to a preferred, hydrophobically associating copolymer (A1).

Preferably, the copolymers (A1) comprises only monomers (a), (b) and (c) and particularly preferably only monomers (a) and (b). The monomers (a) are preferably only one or more monomers of the formula (I). Preferred monomers (a) of the formula (I) have already been mentioned at the start.

In the hydrophobically associating copolymer (A1), the monomers (a) are used in an amount of from 0.1 to 12% by weight, preferably 0.1 to 5% by weight, particularly preferably 0.2 to 3% by weight and very particularly preferably 0.3 to 2% by weight.

The amount of all of the monomers (b) together in the case of the copolymer (A1) is 70 to 99.9% by weight, preferably 80 to 99.8% by weight, with regard to the amount of all of the monomers used. The amount of all of the monomers (c) together is—if present—not more than 29.9% by weight, preferably not more than 19.9% by weight.

The copolymers (A1) usually comprise at least one neutral hydrophilic monomer (b1). Examples of suitable monomers (b1) comprise acrylamide and methacrylamide, preferably acrylamide and derivatives thereof, such as, for example, N-methyl(meth)acrylamide, N,N'-dimethyl(meth)acrylamide and N-methylolacrylamide. Also to be mentioned are N-vinyl derivatives, such as N-vinylformamide, N-vinylacetamide, N-vinylpyrrolidone or N-vinylcaprolactam. Also to be mentioned are monomers having OH groups, such as hydroxyethyl(meth)acrylate, hydroxypropyl(meth)acrylate, allyl alcohol, hydroxyvinyl ethyl ether, hydroxyvinyl propyl ether or hydroxyvinyl butyl ether. The monomer (b1) in copolymer (A1) is preferably acrylamide or derivatives thereof, particularly preferably acrylamide.

In a further embodiment of the invention, the monomer used in copolymer (A1) is at least one anionic monomer (b2) and/or at least one cationic monomer (b2).

The anionic monomers (b2) are monomers comprising acid groups, preferably monomers which comprise at least one group selected from the group of —COOH, —SO$_3$H or –PO$_3$H$_2$. The monomers (b2) are preferably monomers comprising carboxyl groups —COOH and/or sulfonic acid groups —SO$_3$H, particularly preferably monomers comprising sulfonic acid groups —SO$_3$H. They may of course also be the salts of the acidic monomers. Suitable counterions comprise in particular alkali metal ions such as Li$^+$, Na$^+$ or K$^+$, and also ammonium ions such as NH$_4^+$ or ammonium ions with organic radicals.

Examples of anionic monomers (b2) comprise acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid or monomers comprising phosphonic acid groups, such as vinylphosphonic acid, allylphosphonic acid, N-(meth)acrylamidoalkylphosphonic acids or (meth)acryloyloxyalkylphosphonic acids.

Examples of preferred anionic monomers (b2) comprise acrylic acid, vinylsulfonic acid, allylsulfonic acid, 2-acrylamido-2-methylpropanesulfonic acid (AMPS), 2-acrylamidobutanesulfonic acid, 3-acrylamido-3-methylbutanesulfonic acid and 2-acrylamido-2,4,4-trimethylpentanesulfonic acid, very particular preference being given to 2-acrylamido-2-methylpropanesulfonic acid (AMPS).

Cationic monomers (b3) are generally monomers comprising ammonium groups, preferably the aforementioned monomers of the formulae $H_2C=C(R^8)-CO-NR^{14}-R^{12}-NR^{13}_3{}^+X^-$ (Va) and/or $H_2C=C(R^7)-COO-R^{12}-NR^{13}_3{}^+X^-$ (Vb), where the radicals and the ranges and/or species preferred in each case are in each case as defined above. Examples of preferred monomers (b3) comprise 3-trimethylammonium propylacrylamide chloride (DIMAPAQUAT).

Examples of such preferred copolymers (A1) comprise those which comprise at least one monomer (a) and acrylamide or one of the aforementioned acrylamide derivatives, in each case in the aforementioned amounts, and also copolymers which, besides the monomers (a), comprise as monomer (b), monomers comprising sulfonic acid groups, in particular the aforementioned monomers comprising sulfonic acid groups and particularly preferably AMPS.

In a further preferred embodiment of the invention, the copolymer (A1) comprises at least one neutral monomer (b1) and at least one anionic monomer (b2) or at least one cationic monomer (b3), particularly preferably at least one neutral monomer (b1) and at least one anionic monomer (b2).

In this embodiment, it has proven useful to use the neutral monomer (b1) in an amount of from 20 to 95% by weight, preferably 30 to 90% by weight, and the anionic monomer (b2) and/or the cationic monomer (b3) in an amount of from 4.9 to 79.9% by weight, preferably 20 to 69.9% by weight, with the proviso that the total amount of the monomers (b) together is 70 to 99.9% by weight. The monomers (a) are used in the amounts given above.

Examples of such preferred copolymers (A1) comprise copolymers which comprise at least one monomer (a) and acrylamide or one of the aforementioned acrylamide derivatives and also, as monomer (b2), monomers comprising sulfonic acid groups, in particular the aforementioned monomers comprising sulfonic acid groups and particularly preferably AMPS.

In a further preferred embodiment of the invention, the copolymer (A1) comprises at least one neutral monomer (b1), at least one anionic monomer (b2) and at least one cationic monomer (b3).

In the case of this embodiment, it has proven useful to use the neutral monomer (b1) in an amount of from 20 to 95% by weight, preferably 30 to 90% by weight, and the ionic monomers (b2) and (b3) together in an amount of from 4.9 to 79.9% by weight, preferably 20 to 69.9% by weight, with the proviso that the total amount of the monomers (b) together is 70 to 99.9% by weight. In one preferred embodiment, the molar ratio of the anionic monomers (b2) used and of the cationic monomers (b3) (b2)/(b3) is 0.5 to 1.5, preferably 0.7 to 1.3, particularly preferably 0.8 to 1.2 and for example 0.9 to 1.1. This measure makes it possible for copolymers to be obtained which react particularly insensitively to salt content.

Examples of such preferred copolymers (A1) comprise copolymers which comprise at least one monomer (a) and acrylamide or one of the aforementioned acrylamide derivatives and also, as monomer (b2) monomers comprising sulfonic acid groups, in particular the aforementioned monomers comprising sulfonic acid groups and particularly preferably AMPS, and also, as monomer (b3), a salt of 3-trimethylammonium propylacrylamide.

The preparation of the copolymer (A1) preferably takes place photochemically by means of the gel polymerization already described.

The copolymers (A1) preferably have a weight-average molecular weight $M_w$ of from 1000000 g/mol to 20000000 g/mol, preferably 5000000 g/mol to 20000000 g/mol and particularly preferably 10000000 g/mol to 20000000 g/mol.

The copolymers (A1) are notable for the described use for the development, exploitation and completion, in particular the enhanced oil recovery by particularly high thermal stability and salt stability. Furthermore, the inventive use of the monomers (a) of the formula (I) leads to copolymers with a particularly low gel fraction. This effectively avoids blockage of the mineral oil deposits.

Second Preferred Use and Copolymers (A2) and (A3) Preferred for this

In a second preferred embodiment of the invention, the copolymers according to the invention can be used as additive for aqueous construction systems which comprise hydraulic binder systems. Examples of such hydraulic binder systems comprise cement, lime, gypsum or anhydrite.

Examples of such construction systems comprise nonflowable construction systems such as tile adhesives, plasters or gap fillers, and flowable construction systems such as self-leveling floor screeds, sealing and repair mortars, flow screeds, flow concrete, self-compacting concrete, underwater concrete or underwater mortar.

The preferred use amounts of the copolymers according to the invention are between 0.001 and 5% by weight, based on the dry weight of the construction system, depending on the type of use.

The hydrophobically associating copolymers according to the invention can also be used in combination with nonionic polysaccharide derivatives such as methylcellulose (MC), hydroxyethylcellulose (HEC), hydroxypropylcellulose (HPC), methylhydroxyethylcellulose (MHEC), methylhydroxypropylcellulose (MHPC) and also Welan gum or Diutan gum.

For dry mortar applications (e.g. tile adhesive, sealing mortar, plasters, flow screeds), the hydrophobically associating copolymers according to the invention are used in powder form. In this connection, it is advisable to select the size distribution of the particles by adapting the grinding parameters such that the average particle diameter is less than 100 μm and the fraction of particles with a particle diameter greater than 200 μm is less than 2% by weight. Preference is given to those powders whose average particle diameter is less than 60 μm and the fraction of particles with a particle diameter greater than 120 μm is less than 2% by weight. Particular preference is given to those powders whose average particle diameter is less than 50 μm and the fraction of particles with a particle diameter greater than 100 μm is less than 2% by weight.

In the concrete, the copolymers according to the invention are preferably used in the form of aqueous solutions. Of suitability for preparing these solutions are particularly the relatively coarse granules of the copolymers according to the invention with an average particle diameter between 300 μm and 800 μm, where the fraction of particles with a particle diameter of less than 100 μm is less than 2% by weight. The same is true if the copolymers according to the invention are dissolved in other concrete additives or formulations of concrete additives (e.g. in a flow agent).

For the just mentioned preferred use, as additive for hydraulic binder-comprising aqueous construction systems, it is possible to use, besides the hydrophobically associating copolymers A1 according to the invention, preferably the hydrophobically associating copolymer (A2) described below.

Accordingly, in a preferred embodiment, the invention relates to a preferred, hydrophobically associating copolymer (A2). The preferred copolymer (A2) is suitable in particular as additive for nonflowable construction systems such as tile adhesives, plasters or gap fillers.

In the hydrophobically associating copolymer (A2), the monomers (a) are used in an amount of from 0.1 to 12% by weight, preferably 1 to 10% by weight and particularly preferably 1.5 to 8% by weight. Preferably, the copolymer (A2) comprises only monomers (a), (b) and (d) and particularly preferably only monomers (a) and (b).

The monomers (a) may be exclusively monomers (a) of the formula (I), in one preferred embodiment, however, in the case of copolymer (A2), the monomers (a) of the formula (I) can also be used in a mixture with other hydrophobically associating monomers, preferably those of the general formulae $H_2C=C(R^1)-COO-(-CH_2-CH(R^6)-O-)_q-R^7$ (IIa) and/or $H_2C=C(R^1)-O-(-CH_2-CH(R^6)-O-)_q-R^7$ (IIb). The meaning of the radicals and indices and preferred ranges have already been described at the start. In such a mixture, the fraction of the monomers of the formula (I) should usually be at least 25% by weight with regard to the amount of all of the monomers (a), preferably 40 to 90% by weight and for example 40 to 60% by weight. Preferred monomers (a) of the formula (I) have already been mentioned above.

The copolymer (A2) comprises as monomers (b) at least one neutral monomer (b1) and at least one anionic monomer (b2) and/or at least one cationic monomer (b3), preferably at least one neutral monomer (b1) and at least one cationic monomer (b3).

Examples of suitable monomers (b1), (b2) and (b3) have already been specified.

The neutral monomers (b1) in copolymer (A2) are preferably acrylamide or methacrylamide and derivatives thereof, such as, for example, N-methyl(meth)acrylamide, N,N'-dimethyl(meth)acrylamide, N-methylolacrylamide and N-vinyl derivatives such as N-vinylformamide, N-vinylacetamide, N-vinylpyrrolidone or N-vinylcaprolactam. Preferred monomers (b1) in the case of copolymer (A2) are acrylamide, methacrylamide and N-vinylpyrrolidone.

The anionic monomers (b2) in copolymer (A2) are monomers comprising acid groups, preferably monomers which comprise at least one group selected from the group of carboxyl groups —COOH, sulfonic acid groups —$SO_3H$ or phosphonic acid groups —$PO_3H_2$.

The anionic monomers (b2) in the copolymer (A2) are preferably monomers comprising sulfonic acid groups —$SO_3H$. Examples of preferred monomers comprise vinylsulfonic acid, allylsulfonic acid, 2-acrylamido-2-methylpropanesulfonic acid (AMPS), 2-acrylamidobutanesulfonic acid, 3-acrylamido-3-methylbutanesulfonic acid and 2-acrylamido-2,4,4-trimethylpentanesulfonic acid, preference being given to 2-acrylamido-2-methylpropanesulfonic acid (AMPS).

The cationic monomers (b3) in copolymer (A2) are preferably the aforementioned monomers of the formulae $H_2C=C(R^8)-CO-NR^{14}-R^{12}-NR^{13}_3{}^+X^-$ (Va) and/or $H_2C=C(R^8)-COO-R^{12}-NR^{13}_3{}^+X^-$ (Vb), where the radicals and the ranges and/or species preferred in each case are in each case as defined above. Particular preference is given to 3-trimethylammonium propylacrylamide chloride (DIMAPAQUAT).

In the copolymers (A2), the amount of the anionic monomers (b2) and of the cationic monomers (b3) is generally 25 to 80% by weight, with regard to the sum of all of the monomers, preferably 40 to 75% by weight, particularly preferably 45 to 70% by weight and that of the neutral monomers (b1) is 15 to 60% by weight, preferably 20 to 50% by weight, with the proviso that the sum of the monomers (b1) and (b2) and (b3) together is 70 to 99.9% by weight. The monomers (a) are used in the amounts mentioned at the start.

Preferred copolymers (A2) comprise either an anionic monomer (b2) or a cationic monomer (b3) in the amounts already given. If a mixture of (b2) and (b3) is used, the weight ratio (b2)/(b3) can in principle be chosen freely.

For the just mentioned preferred use as additive for hydraulic binder-comprising aqueous construction systems, the hydrophobically associating copolymer (A3) described below can also be used.

Accordingly, in a third preferred embodiment, the invention relates to a hydrophobically associating copolymer (A3). The preferred copolymer (A3) is suitable in particular as additive for flowable construction systems, in particular for concrete, flow screeds, self-leveling troweling compositions and sealing mortars.

In the case of the hydrophobically associating copolymer (A3), the monomers (a) are used in an amount of from 0.1 to 12% by weight, preferably 1 to 10% by weight and particularly preferably 1.5 to 8% by weight. Preferably, the copolymer (A3) comprises only monomers (a), (b) and (d) and particularly preferably only monomers (a) and (b).

The monomers (a) may be exclusively monomers (a) of the formula (I), in a preferred embodiment in the case of copolymer (A3), however, the monomers (a) of the formula (I) can also be used in a mixture with other hydrophobically associating monomers, preferably those of the general formula $H_2C=C(R^1)-COO-(-CH_2-CH(R^6)-O-)_q-R^7$ (IIa) and/or $H_2C=C(R^1)-O-(-CH_2-CH(R^6)-O-)_q-R^7$ (IIb). The meaning of the radicals and indices and also preferred ranges have already been described at the start. In the case of such a mixture, the fraction of the monomers of the formula (I) should generally be at least 25% by weight with regard to the amount of all of the monomers (a), preferably 40 to 90% by weight and for example 40 to 60% by weight. Preferred monomers (a) of the formula (I) have already been mentioned above.

The copolymer (A3) comprises as monomers (b) at least one neutral monomer (b1) and at least one anionic monomer (b2). Examples of suitable monomers (b1) and (b2) have already been given.

The neutral monomers (b1) in copolymer (A3) are acrylamide or methacrylamide and derivatives thereof, such as, for example, N-methyl(meth)acrylamide, N,N'-dimethyl(meth)acrylamide, N-methylolacrylamide and N-vinyl derivatives such as N-vinylformamide, N-vinylacetamide, N-vinylpyrrolidone or N-vinylcaprolactam. Preferred monomers (b1) in copolymer (A3) are acrylamide, methacrylamide and N-vinylpyrrolidone.

The anionic monomers (b2) in copolymer (A3) are monomers comprising acid groups, preferably monomers which comprise at least one group selected from the group of carboxyl groups —COOH, sulfonic acid groups —$SO_3H$ or phosphonic acid groups —$PO_3H_2$.

Preferably, in copolymer (A3) the monomers (b2) are monomers comprising sulfonic acid groups —$SO_3H$. Examples of preferred monomers comprise vinylsulfonic acid, allylsulfonic acid, 2-acrylamido-2-methylpropanesulfonic acid (AMPS), 2-acrylamidobutanesulfonic acid, 3-acrylamido-3-methylbutanesulfonic acid and 2-acrylamido-2,4,4-trimethylpentanesulfonic acid, preference being given to 2-acrylamido-2-methylpropanesulfonic acid (AMPS).

In the preferred copolymers (A3), the amount of anionic monomers (b2) is generally 25 to 94.9% by weight, with regard to the sum of all of the monomers, preferably 50 to 90% by weight, particularly preferably 60 to 90% by weight and that of the neutral monomers (b1) is 5 to 50% by weight, preferably 5 to 30% by weight, with the proviso that the sum of the monomers (b1) and (b2) together is 70 to 99.9% by weight. The monomers (a) are used in the amounts mentioned at the start.

For the use as additive for aqueous construction systems, it may be advantageous to use additionally crosslinking monomers (d). These give the hydrophobically associating copolymers (A1), (A2) and (A3) according to the invention a slightly branched or crosslinked structure.

Examples of preferred monomers (d) comprise triallylamine, triallylmethylammonium chloride; tetraallylammonium chloride, N,N'-methylenebisacrylamide, triethylene glycol bismethacrylate, triethylene glycol bisacrylate, polyethylene glycol(400)bismethacrylate and polyethylene glycol(400)bisacrylate.

The amount of monomers (d) is determined by the person skilled in the art depending on the desired properties of the copolymers. However, the monomers (d) must only be used in amounts such that the solubility in water of the hydrophobically associating copolymers according to the invention is not impaired. As a rule, the amount of the monomers (d) should not exceed 1% by weight with regard to the amount of all of the monomers used. Preferably, not more than 0.5% by weight and particularly preferably not more than 0.1% by weight should be used; however, a person skilled in the art can easily determine the maximum amount of monomers (d) that can be used.

Third Preferred Use and Copolymers (A4) Preferred for this

A fourth preferred embodiment of the invention deals with a hydrophobically associating copolymer (A4). The copolymer (A4) is usually an alkali-soluble dispersion. Copolymers of this type are suitable in particular for use as thickeners in the field of detergents and cleaners, cosmetic formulations and technochemical applications.

Besides the monomers (a), the copolymer (A4) comprises at least one monomer (b) having acid groups, and at least one monomer (c). It is of course also possible for several different monomers (c) to be used.

Preferred monomers (a) have already been mentioned at the start.

The monomers (b) having acid groups in copolymer (A4) are preferably the monomers (b2) already cited above. These are preferably monomers having carboxylic acid groups, such as, for example, acrylic acid, methacrylic acid, crotonic acid, itaconic acid, maleic acid or fumaric acid, particularly preferably (meth)acrylic acid.

The monomers (c) are preferably at least one (meth)acrylic acid ester of the general formula $H_2C=C(R^{16})-COOR^{18}$, where $R^{16}$ and $R^{18}$ are as defined above. Examples of such monomers (c) comprise esters of (meth)acrylic acid, for example alkyl(meth)acrylates, such as methyl(meth)acrylate, ethyl(meth)acrylate, n-propyl(meth)acrylate, n-butyl(meth)acrylate, 2-ethylhexyl(meth)acrylate or 2-propylheptyl (meth)acrylate.

The copolymer (A4) preferably comprises at least one (meth)acrylic acid ester in which $R^9$ is an aliphatic, straight-chain or branched hydrocarbon radical having 2 to 10 carbon atoms, preferably 4 to 8 carbon atoms. Examples comprise ethyl(meth)acrylate, n-propyl(meth)acrylate, n-butyl(meth)acrylate, 2-ethylhexyl(meth)acrylate or 2-propylheptyl (meth)acrylate.

In the hydrophobically associating copolymer (A4), the monomers (a) are used in an amount of from 0.1 to 20% by weight, preferably 0.5 to 15% by weight and particularly preferably 2 to 12% by weight, in each case based on the total amount of all monomers in the copolymer.

The amount of monomers (b) in the copolymers (A4) is 25 to 94.9% by weight, preferably 25 to 50% by weight and particularly preferably 25 to 40% by weight.

The amount of the monomers (c) in the copolymers (A4) is 5 to 74.9% by weight, preferably 25 to 74.5% by weight and particularly preferably 50 to 70% by weight.

The copolymers (A4) according to the invention are particularly suitable as thickeners or rheology modifiers in coating slips, for example for detergents, washing auxiliaries such as, for example, pre-spotters, fabric softeners, cosmetic formulations, pharmaceutical formulations, foods, coating slips, formulations for textile production, textile printing pastes, printing inks, printing pastes for textile printing, paints, pigment slurries, aqueous formulations for generating foam, deicing mixtures, for example for aircraft, formulations for the construction industry, such as, for example, as additive for aqueous construction systems based on hydraulic binders such as cement, lime, gypsum and anhydrite, and also in water-based paint and coating systems.

Particular preference is given to the use in liquid detergents and cleaners. Besides a copolymer (A4), liquid detergents and cleaners comprise one or more anionic, nonionic, cationic and/or amphoteric surfactants as well as other typical detergent additives. Preference is given to mixtures of anionic and nonionic surfactants. The total surfactant content of the liquid detergents or cleaners is preferably 0.5 to 80% by weight and particularly preferably 0.5 to 50% by weight, based on the total liquid detergent or cleaner. Suitable surfactants are known to the person skilled in the art and disclosed, for example, in WO 2009/019225, page 8, line 34 to page 12, line 37.

The further components are one or more substances selected from the group of builders, bleaches, bleach activators, enzymes, electrolytes, nonaqueous solvents, pH extenders, fragrances, perfume carriers, fluorescent agents, dyes, hydrotopes, foam inhibitors, silicone oils, antiredeposition agents, optical brighteners, graying inhibitors, antishrink agents, crease protection agents, color transfer inhibitors, antimicrobial active ingredients, germicides, fungicides, antioxidants, corrosion inhibitors, antistats, ironing aids, phobicizing and impregnation agents, antiswell and antislip agents and also UV absorbers. Such detergent additives are known to the person skilled in the art and disclosed, for example, in WO 2009/019225, page 12, line 39 to page 24, line 4.

The following examples are intended to illustrate the invention in more detail:

PART A) PREPARATION OF THE MONOMERS
(I)

Preparation of a Hydroxybutyl Vinyl Ether Alkoxylate Having 22 EO Units and 8 PeO Units (Monomer M1)

52.3 g of hydroxybutyl vinyl ether were initially introduced into a 1 l stirred autoclave made of stainless steel. 2.99 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 436 g of EO were then metered in over the course of ca. 3.5 h. After a postreaction for half an hour at 140° C., the reactor was cooled to 125° C. and a total of 310 g of pentene oxide were metered in over the course of 3.0 h. The postreaction ran overnight.

The product had an OH number of 34.2 mg KOH/g (theory: 31.6 mg KOH/g). The OH number was determined by means of the ESA method.

Preparation of a Hydroxybutyl Vinyl Ether Alkoxylate with 22 EO Units and 12 PeO Units (Monomer M2)

44.1 g of hydroxybutyl vinyl ether were initially introduced into a 1 l stirred autoclave made of stainless steel. 3.12 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 368 g of EO were then metered in over the course of ca. 3 h. After a postreaction for half an hour at 140° C., the reactor was cooled to 125° C. and a total of 392 g of pentene oxide were metered in over the course of 3.5 h. The postreaction ran overnight.

The product had an OH number of 31.9 mg KOH/g (theory: 26.5 mg KOH/g). The OH number was determined by means of the ESA method.

Preparation of a Hydroxybutyl Vinyl Ether Alkoxylate with 22 ED Units and 16 PeO Units (Monomer M3)

37.8 g of hydroxybutyl vinyl ether were initially introduced into a 1 l stirred autoclave made of stainless steel. 3.01 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 315 g of EO were then metered in over the course of ca. 3 h. After a postreaction for half an hour at 140° C., the reactor was cooled to 125° C. and a total of 448 g of pentene oxide were metered in over the course of 4.5 h. The postreaction ran overnight.

The product had an OH number of 25.2 mg KOH/g (theory: 22.7 mg KOH/g). The OH number was determined by means of the ESA method.

Preparation of a Hydroxybutyl Vinyl Ether Alkoxylate with 22 EO Units and 20 PeO Units (Monomer M4)

33.2 g of hydroxybutyl vinyl ether were initially introduced into a 1 l stirred autoclave made of stainless steel. 3.01 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 277 g of EO were then metered in over the course of ca. 2.5 h. After a postreaction for half an hour at 140° C., the reactor was cooled to 125° C. and a total of 492 g of pentene oxide were metered in over the course of 5 h. The postreaction ran overnight.

The product had an OH number of 23.2 mg KOH/g (theory: 20.0 mg KOH/g). The OH number was determined by means of the ESA method.

Preparation of a Hydroxybutyl Vinyl Ether Alkoxylate with 68 EO Units and 8 PeO Units (Monomer M5)

24.3 g of hydroxybutyl vinyl ether were initially introduced into a 1 l stirred autoclave made of stainless steel. 2.98 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 627 g of EO were then metered in over the course of ca. 5.5 h. After a postreaction for half an hour at 140° C., the reactor was cooled to 125° C. and a total of 144 g of pentene oxide were metered in over the course of 2.5 h. The postreaction ran overnight.

The product had an OH number of 17.6 mg KOH/g (theory: 14.7 mg KOH/g). The OH number was determined by means of the ESA method.

Preparation of a Hydroxybutyl Vinyl Ether Alkoxylate with 22 EO Units and 12 PeO Units (Monomer M6)

22.5 g of hydroxybutyl vinyl ether were initially introduced into a 1 l stirred autoclave made of stainless steel. 3.01 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 580 g of EO were then metered in over the course of ca. 5 h. After a postreaction for half an hour at 140° C., the reactor was cooled to 125° C. and a total of 200 g of pentene oxide were metered in over the course of 3.0 h. The postreaction ran overnight.

The product had an OH number of 16.8 mg KOH/g (theory: 13.5 mg KOH/g). The OH number was determined by means of the ESA method.

Preparation of a Hydroxybutyl Vinyl Ether Alkoxylate with 132 EO Units and 8 PeO Units (Monomer M7)

14.1 g of hydroxybutyl vinyl ether were initially introduced into a 1 l stirred autoclave made of stainless steel. 3.02 g of KOMe (32% strength in MeOH) were then metered in and the methanol was drawn off at 80° C. and ca. 30 mbar. The mixture was then heated to 140° C., the reactor was flushed with nitrogen and a nitrogen pressure of 1.0 bar was established. 706 g of EO were then metered in over the course of ca. 8 h. After a postreaction for half an hour at 140° C., the reactor was cooled. On the next day, at 125° C., a total of 83.6 g of pentene oxide were metered in over the course of 2.0 h. A postreaction of 5 hours at 125° C. followed.

The product had an OH number of 10.2 mg KOH/g (theory: 8.5 mg KOH/g). The OH number was determined by means of the ESA method.

The data for the synthesized monomers M1 to M7 are summarized in table 1 below. All monomers have a terminal OH group.

TABLE 1

| | Synthesized monomers (I) | | | | |
|---|---|---|---|---|---|
| | | Block 1 | | Block 2 | |
| Monomer No. | Alcohol | Number of EO units | Alkylene oxide | Number of units | OH number [mg KOH/g] |
| M1 | 4-hydroxybutyl vinyl ether | 22 | pentene oxide | 8 | 34.2 |
| M2 | 4-hydroxybutyl vinyl ether | 22 | pentene oxide | 12 | 31.9 |
| M3 | 4-hydroxybutyl vinyl ether | 22 | pentene oxide | 16 | 25.2 |
| M4 | 4-hydroxybutyl vinyl ether | 22 | pentene oxide | 20 | 23.2 |
| M5 | 4-hydroxybutyl vinyl ether | 68 | pentene oxide | 8 | 17.6 |
| M6 | 4-hydroxybutyl vinyl ether | 68 | pentene oxide | 12 | 16.8 |
| M7 | 4-hydroxybutyl vinyl ether | 132 | pentene oxide | 8 | 10.2 |

For the comparative experiments, commercially available, hydrophobically associating monomers of the following general formula were used: $H_2C=C(CH_3)-COO-(EO)_x-R$. R and x here in the monomers M8 and M9 have the following meaning:

M8: x=25, R=tristyrylphenyl
M9: x=7, R=n-dodecyl

PART B) PREPARATION OF THE HYDROPHOBICALLY ASSOCIATING COPOLYMERS

Part B-1) Preparation of Hydrophobically Associating Copolymers of the Type (A1)

Example 1

Hydrophobically associating amphoteric copolymer of the type (A1) of acrylamide (35.9% by weight), an anionic monomer (acrylamido-2-methylpropanesulfonic acid, Na salt, 32.1% by weight), a cationic monomer (3-trimethylammonium propylacrylamide chloride, 31.0% by weight) and the monomer M1 according to the invention (1% by weight)

The following components were mixed together in a 2 l three-necked flask fitted with stirrer and thermometer:

| | |
|---|---|
| 139.1 g | acrylamido-2-methylpropanesulfonic acid, Na salt (58% strength by weight solution in water; 17.6 mol %), |
| 1.2 g | silicone defoamer, |
| 2.4 g | pentasodium diethylenetriaminepentaacetate (complexing agent), |
| 111.6 g | 3-trimethylammonium propylacrylamide chloride (60% strength by weight solution in water; 18.8 mol %), |
| 160.1 g | acrylamide (50% strength by weight solution in water; 63.5 mol %), |
| 2.1 g | monomer M1, |
| 12 g | urea |

1.5 g of sodium hypophosphite (0.1% strength by weight solution in water) were added as molecular weight regulator. The solution was adjusted to pH 6 using 20% strength sodium hydroxide solution, rendered inert by flushing for 10 minutes with nitrogen and cooled to ca. 5° C. The solution was transferred to a plastic container and then, in succession, 150 ppm of 2,2'-azobis(2-amidinopropane)dihydrochloride (as 1% strength by weight solution), 10 ppm of tert-butyl hydroperoxide (as 0.1% strength by weight solution) and 20 ppm of sodium hydroxymethanesulfinate (as 1% strength by weight solution) were added. The polymerization was started by irradiating with UV light (two Philips tubes; Cleo Performance 40 W). After ca. 2 h, the hard gel was removed from the plastic container and cut using scissors into gel cubes measuring ca. 5 cm×5 cm×5 cm. Before the gel cubes were comminuted using a conventional meat grinder, they were coated with a standard commercial release agent. The release agent is a polydimethylsiloxane emulsion which was diluted 1:20 with water. The resulting gel granules were slump uniformly on drying meshes and dried to constant weight in a convection drying oven at ca. 90 to 120° C. in vacuo.

Comparative Example 1

Polymer analogous to example 1, but without hydrophobically associating monomer

The following components were mixed together in a 2 l three-necked flask fitted with stirrer and thermometer:

| | |
|---|---|
| 139.1 g | acrylamido-2-methylpropanesulfonic acid, Na salt (58% strength by weight solution in water; 17.4 mol %), |
| 1.2 g | silicone defoamer, |
| 2.4 g | pentasodium diethylenetriaminepentaacetate (complexing agent), |
| 111.6 g | 3-trimethylammonium propylacrylamide chloride (60% strength by weight solution in water; 18.5 mol %), |
| 164.5 g | acrylamide (50% strength by weight solution in water; 64.2 mol %), |
| 12 g | urea |

The solution was adjusted to pH 6 using 20% strength sodium hydroxide solution, rendered inert by flushing for 10 minutes with nitrogen and cooled to ca. 5° C. The solution was transferred to a plastic container and then, in succession, 150 ppm of 2,2'-azobis(2-amidinopropane)dihydrochloride (as 1% strength by weight solution), 10 ppm of tem-butyl hydroperoxide (as 0.1% strength by weight solution) and 20 ppm of sodium hydroxymethanesulfinate (as 1% strength by weight solution) were added. The polymerization was started by irradiating with UV light (two Philips tubes; Cleo Performance 40 W). After ca. 2 h, the hard gel was removed from the plastic container and cut using scissors into gel cubes measuring ca. 5 cm×5 cm×5 cm. Before the gel cubes were comminuted using a conventional meat grinder, they were coated with a standard commercial release agent. The release agent is a polydimethylsiloxane emulsion which was diluted 1:20 with water. The resulting gel granules were distributed uniformly on drying meshes and dried to constant weight in a convection drying oven at ca. 90 to 120° C. in vacuo.

Comparative Example 2

Polymer analogous to example 1, but instead of the hydrophobically associating monomer according to the invention, monomer M8 was used The following components were mixed together in a 2 l three-necked flask fitted with stirrer and thermometer:

| | |
|---|---|
| 139.1 g | acrylamido-2-methylpropanesulfonic acid, Na salt (58% strength by weight solution in water; 17.6 mol %), |
| 1.2 g | silicone defoamer, |
| 2.4 g | pentasodium diethylenetriaminepentaacetate (complexing agent), |
| 111.6 g | 3-trimethylammonium propylacrylamide chloride (60% strength by weight solution in water; 18.8 mol %), |
| 155.2 g | acrylamide (50% strength by weight solution in water; 63.5 mol %), |
| 3.5 g | monomer M8, |
| 12 g | urea |

1.5 g of sodium hypophosphite (0.1% strength by weight solution in water) were added as molecular weight regulator. The solution was transferred to a plastic container and then, in succession, 150 ppm of 2,2'-azobis(2-amidinopropane)dihydrochloride (as 1% strength by weight solution), 10 ppm of ten' butyl hydroperoxide (as 0.1% strength by weight solution) and 20 ppm of sodium hydroxymethanesulfinate (as 1% strength by weight solution) were added. The polymerization was started by irradiating with UV light (two Philips tubes; Cleo Performance 40 W). After ca. 2 h, the hard gel was removed from the plastic container and cut using scissors into gel cubes measuring ca. 5 cm×5 cm×5 cm. Before the gel cubes were comminuted using a conventional meat grinder, they were coated with a standard commercial release agent. The release agent is a polydimethylsiloxane emulsion which was diluted 1:20 with water. The resulting gel granules were distributed uniformly on drying meshes and dried to constant weight in a convection drying oven at ca. 90 to 120° C. in vacuo.

Comparative Example 3

Polymer analogous to example 1, but instead of the hydrophobically associating monomer according to the invention, the monomer M9 was used The following components were mixed together in a 2 l three-necked flask fitted with stirrer and thermometer:

| | |
|---|---|
| 139.0 g | acrylamido-2-methylpropanesulfonic acid, Na salt (58% strength by weight solution in water; 17.6 mol %), |
| 1.2 g | silicone defoamer, |
| 2.4 g | pentasodium diethylenetriaminepentaacetate (complexing agent), |
| 111.6 g | 3-trimethylammonium propylacrylamide chloride (60% strength by weight solution in water; 18.8 mol %), |
| 155.2 g | acrylamide (50% strength by weight solution in water; 63.4 mol %), |
| 2.2 g | monomer M9, |
| 12 g | urea |

1.5 g of sodium hypophosphite (0.1% strength by weight solution in water) were added as molecular weight regulator. The solution was transferred to a plastic container and then, in succession, 150 ppm of 2,2'-azobis(2-amidinopropane)dihydrochloride (as 1% strength by weight solution), 10 ppm of tert-butyl hydroperoxide (as 0.1% strength by weight solution) and 20 ppm of sodium hydroxymethanesulfinate (as 1% strength by weight solution) were added. The polymerization was started by irradiating with UV light (two Philips tubes; Cleo Performance 40 W). After ca. 2 h, the hard gel was removed from the plastic container and cut using scissors into gel cubes measuring ca. 5 cm×5 cm×5 cm. Before the gel cubes were comminuted using a conventional meat grinder, they were coated with a standard commercial release agent. The release agent is a polydimethylsiloxane emulsion which was diluted 1:20 with water. The resulting gel granules were distributed uniformly on drying meshes and dried to constant weight in a convection drying oven at ca. 90 to 120° C. in vacuo.

Examples 2 to 8

Hydrophobically associating copolymers of the type (A1) of acrylamide (48% by weight) and acrylamido-2-methylpropanesulfonic acid, Na salt (50% by weight) and a hydrophobically associating monomer according to the invention (2% by weight)

The following components were mixed together in a 2 l three-necked flask fitted with stirrer and thermometer:

| | |
|---|---|
| 290 g | distilled water, |
| 242.5 g | acrylamido-2-methylpropanesulfonic acid, Na salt (58% strength by weight solution in water; 24.7 mol %), |
| 1.2 g | silicone defoamer, |
| 2.4 g | pentasodium diethylenetriaminepentaacetate (complexing agent), |
| 228.8 g | acrylamide (50% strength by weight solution in water; 75.2 mol %), |
| 4.6 g | monomers of one of the monomers M1 to M7 (as in table) |

The solution was adjusted to pH 6 using 20% strength sodium hydroxide solution, rendered inert by flushing for 10 minutes with nitrogen and cooled to ca. 5° C. The solution was transferred to a plastic container and then, in succession, 200 ppm of 2,2'-azobis(2-amidinopropane)dihydrochloride (as 1% strength by weight solution), 10 ppm of tert-butyl hydroperoxide (as 0.1% strength by weight solution), 5 ppm of $FeSO_4 \cdot 7H_2O$ (as 1% strength by weight solution) and 6 ppm of sodium bisulfite (as 1% strength by weight solution) were added. The polymerization was started by irradiating with UV light (two Philips tubes; Cleo Performance 40 W). After ca. 2 h, the hard gel was removed from the plastic container and cut using scissors into gel cubes measuring ca. 5 cm×5 cm×5 cm. Before the gel cubes were comminuted using a conventional meat grinder, they were coated with a standard commercial release agent. The release agent is a polydimethylsiloxane emulsion which was diluted 1:20 with water. The resulting gel granules were distributed uniformly on drying meshes and dried to constant weight in a convection drying oven at ca. 90 to 120° C. in vacuo.

Part B-2) Preparation of Hydrophobically Associating Copolymers of the Types (A2) and (A3)

Example 9

Hydrophobically associating copolymer of the type (A2) of acrylamide (33% by weight), 3-(acrylamino)propyltrimethylammonium chloride (57% by weight), acrylic acid (2% by weight) and a mixture of the hydrophobically associating monomer M8 (3% by weight) and the monomer M5 according to the invention (5% by weight)

The following components were mixed together in a 2 l three-necked flask fitted with stirrer and thermometer:

| | |
|---|---|
| 170 g | distilled water, |
| 1.6 g | silicone defoamer, |
| 2.4 g | pentasodium diethylenetriaminepentaacetate (complexing agent), |
| 5.8 g | acrylic acid (99.5% strength by weight; 3.6 mol %), |
| 273.6 g | 3-(acrylamino)propyltrimethylammonium chloride (60% strength by weight solution in water; 35.7 mol %), |
| 190.5 g | acrylamide (50% strength by weight solution in water; 60.3 mol %), |
| 14.4 g | monomer M8 (60% strength by weight solution in water), |
| 14.4 g | monomer M5 (0.2 mol %), |

0.5 g of formic acid (10% strength by weight solution in water) was added as molecular weight regulator. The solution was adjusted to pH 7 using 20% strength sodium hydroxide solution, rendered inert by flushing for 5 minutes with nitrogen and cooled to ca. 5'C. The solution was transferred to a plastic container and then, in succession, 250 ppm of 2,2'-azobis(2-amidinopropane)dihydrochloride (as 1% strength by weight solution), 20 ppm of tert-butyl hydroperoxide (as 0.1% strength by weight solution) and 30 ppm of sodium bisulfite (as 1% strength by weight solution) were added. The polymerization was started by irradiating with UV light (two Philips tubes; Cleo Performance 40 W). After ca. 2 h, the hard gel was removed from the plastic container and cut using scissors into gel cubes measuring ca. 5 cm×5 cm×5 cm. Before the gel cubes were comminuted using a standard commercial meat grinder, they were coated with a standard commercial release agent. The release agent is a polydimethylsiloxane emulsion which was diluted 1:20 with water. The resulting gel granules were distributed uniformly on drying meshes and dried to constant weight in a convection drying oven at ca. 90 to 120° C. in vacuo.

Example 10

Hydrophobically associating copolymer of the type (A2) of dimethylacrylamide (32% by weight), 3-(acrylamino)propyltrimethylammonium chloride (59% by weight), acrylic acid (2% by weight) and a mixture of the hydrophobically associating monomer M8 (2% by weight) and a monomer M5 according to the invention (5% by weight)

The procedure was as in example 9, except that the following components were used:

| | |
|---|---|
| 170 g | distilled water, |
| 1.6 g | silicone defoamer, |
| 6.9 g | acrylic acid (99.5% strength by weight; 4.3 mol %), |
| 338.2 g | 3-(acrylamino)propyltrimethylammonium chloride (60% strength by weight solution in water; 44.6 mol %), |
| 111.2 g | dimethylacrylamide (50.6 mol %), |
| 14.4 g | monomer M8 (60% strength by weight solution in water), |
| 17.2 g | monomer M5 |

Example 11

Hydrophobically associating copolymer of type (A2) of acrylamide (10% by weight), N-vinylpyrrolidone (28% by weight), acrylamido-2-methylpropanesulfonic acid, Na salt (50% by weight), acrylic acid (2% by weight) and the monomer M6 according to the invention (10% by weight)

The procedure was as in example 9, except that the following components were used:

| | |
|---|---|
| 170 g | distilled water, |
| 1.6 g | silicone defoamer, |
| 2.4 g | pentasodium diethylenetriaminepentaacetate, |
| 6.1 g | acrylic acid (99.5% strength by weight; 4.2 mol %), |
| 336.1 g | acrylamido-2-methylpropanesulfonic acid, Na salt (58% strength by weight solution in water; 36.2 mol %), |
| 60.9 g | acrylamide (50% strength by weight solution in water; 21.2 mol %), |
| 85.9 g | N-vinylpyrrolidone (38.1 mol %) |
| 30.4 g | monomer M6 |

Example 12

Hydrophobically associating copolymer of the type (A2) of acrylamide (10% by weight), N-vinylpyrrolidone (38.1% by weight), 3-(acrylamino)propyltrimethylammonium chloride (50% by weight), acrylic acid (2% by weight) and the monomer M6 according to the invention (10% by weight)

The procedure was as in example 9, except that the following components were used:

| | |
|---|---|
| 170 g | distilled water, |
| 1.6 g | silicone defoamer, |
| 2.4 g | pentasodium diethylenetriaminepentaacetate, |
| 7.7 g | acrylic acid (99.5% strength by weight; 4.1 mol %), |
| 320.0 g | 3-(acrylamino)propyltrimethylammonium chloride (60% strength by weight solution in water; 36.2 mol %), |
| 79.4 g | acrylamide (50% strength by weight solution in water; 21.2 mol %), |
| 108.6 | N-vinylpyrrolidone (38.1 mol %), |
| 38.4 g | monomer M6 |

Example 13

Hydrophobically associating copolymer of the type (A3) of dimethylacrylamide (19.2% by weight), acrylamido-2-methylpropanesulfonic acid, Na salt (77% by weight) and a mixture of the hydrophobically associating monomer M8 (0.8% by weight) and a monomer M1 according to the invention (3% by weight)

The following components were mixed together in a 2 l three-necked flask fitted with stirrer and thermometer:

| | |
|---|---|
| 1377 g | distilled water, |
| 3 g | silicone defoamer, |
| 315 g | acrylamido-2-methylpropanesulfonic acid, Na salt (58% strength by weight solution in water; 65.5 mol %), |
| 35.8 g | dimethylacrylamide (34.1 mol %), |
| 2.6 g | monomer M8 (60% strength by weight solution in water), |
| 5.6 g | monomer M1 |

The solution was adjusted to pH 7 using 20% strength sodium hydroxide solution, rendered inert by flushing for 10 min with nitrogen, heated to ca. 50° C. and, in succession, 1500 ppm of sodium peroxodisulfate (as 20% strength by weight solution) and 240 ppm of tetraethylenepentamine (as 20% strength by weight solution) were added. After ca. 2 hours, the polymer solution was dried to constant weight in a convection drying oven at ca. 90 to 120° C. in vacuo and finally ground.

Example 14

Hydrophobically associating copolymer of the type (A3) of dimethylacrylamide (35% by weight), acrylamido-2-methylpropanesulfonic acid, Na salt (60% by weight) and the monomer M1 according to the invention (5% by weight)

The following components were mixed together in a 2 l three-necked flask fitted with stirrer and thermometer:

| | |
|---|---|
| 539.2 g | acrylamido-2-methylpropanesulfonic acid, Na salt (58% strength by weight solution in water; 44.9 mol %), |
| 1.6 g | silicone defoamer, |
| 143.51 g | dimethylacrylamide (54.7 mol %), |
| 20.4 g | monomer M1 |

4 g of formic acid (10% strength by weight solution in water) were added as molecular weight regulator. The solution was adjusted to pH 7 using 20% strength sodium hydroxide solution, rendered inert by flushing for 10 min with nitrogen and cooled to ca. 5° C. The solution was transferred to a plastic container and then, in succession, 150 ppm of 2,2'-azobis(2-amidinopropane)dihydrochloride (as 1% strength by weight solution), 6 ppm of tert-butyl hydroperoxide (as 0.1% strength by weight solution), 6 ppm of sodium hydroxymethanesulfinate (as 1% strength by weight solution) and 3 ppm of $FeSO_4*7H_2O$ (as 1% strength by weight solution) were added. The work-up was carried out as described above.

Comparative Example 4

Hydrophobically associating copolymer with acrylamide and 3-(acrylamino)propyltrimethylammonium chloride without monomers according to the invention The procedure was as in example 9, except that the following components were used:

| | |
|---|---|
| 170 g | distilled water, |
| 1.6 g | silicone defoamer, |
| 2.4 g | pentasodium diethylenetriaminepentaacetate, |
| 5.4 g | acrylic acid (99.5% strength by weight; 2.9 mol %), |
| 148 g | 3-(acrylamino)propyltrimethylammonium chloride (60% strength by weight solution in water; 18.3 mol %), |
| 259.7 g | acrylamide (50% strength by weight solution in water; 78.6 mol %), |
| 20.0 g | polyethylene glycol (3000) vinyl oxybutyl ether (VOB, 60% strength by weight solution in water; 0.2 mol %), |
| 8.0 g | monomer M8 (60% strength by weight solution in water). |

Comparative Example 5

Hydrophobically associating copolymer with dimethylacrylamide and acrylamido-2-methylpropanesulfonic acid, Na salt without monomer according to the invention The procedure was as in example 9, except that the following components were used:

| | |
|---|---|
| 170 g | distilled water, |
| 1.6 g | silicone defoamer, |
| 2.4 g | pentasodium diethylenetriaminepentaacetate, |
| 528 g | acrylamido-2-methylpropanesulfonic acid, Na salt (58% strength by weight solution in water; 48.1 mol %), |
| 175 g | acrylamide (50% strength by weight solution in water; 51.5 mol %), |
| 29.2 g | polyethylene glycol (3000) vinyl oxybutyl ether (VOB, 60% strength by weight solution in water; 0.2 mol %), |
| 11.9 g | monomer M8 (60% strength by weight solution in water) |

Comparative Example 6

The following components were mixed together in a 2 l three-necked flask fitted with stirrer and thermometer:

| | |
|---|---|
| 1.6 g | silicone defoamer, |
| 578.0 g | acrylamido-2-methylpropanesulfonic acid, Na salt (58% strength by weight solution in water; 62.2 mol %), |
| 104.8 g | acrylamide (50% strength by weight solution in water; 36.4 mol %), |
| 43.5 g | polyethylene glycol (1100) vinyloxy butyl ether (VOB, 60% strength by weight solution in water) |

300 ppm of formic acid (10% strength by weight solution in water) were added as molecular weight regulator. The solution was adjusted to pH 7 using 20% strength sodium hydroxide solution, rendered inert by flushing for 10 min with nitrogen and cooled to ca. 5° C. The solution was transferred to a plastic container and then, in succession, 150 ppm of 2,2'-azobis(2-amidinopropane)dihydrochloride (as 1% strength by weight solution), 6 ppm of tert-butyl hydroperoxide (as 0.1% strength by weight solution), 6 ppm of sodium hydroxymethanesulfinate (as 1% strength by weight solution) and 3 ppm of $FeSO_4 \cdot 7H_2O$ (as 1% strength by weight solution) were added. The work-up was carried out as described above.

Part B-3) Preparation of Hydrophobically Associating Copolymer Dispersions of the Type (A4)

Comparative Example 7

The copolymer preparation was carried out in accordance with the method described below. The resulting aqueous polymer dispersion comprised the copolymers in their acid form.

In a stirred apparatus, consisting of a 4 liter HWS vessel with anchor stirrer (150 rpm), reflux condenser, internal thermosensor and metering station, 484.5 g of demineralized water (DM water) and 8.21 g of an emulsifier (sodium lauryl ether sulfate; 28% strength in water) were mixed as initial charge.

At 75° C., 12.49 g of a 7% strength aqueous sodium peroxodisulfate solution were added to this solution and the mixture was stirred at 75° C. for 5 minutes. Then, at 75° C. and with further stirring, an emulsion consisting of 429.91 g of completely demineralized water, the monomers (140.82 g of methacrylic acid, 161 g of ethyl acrylate, and 161 g of n-butyl acrylate) and 16.43 g of sodium lauryl ether sulfate (27-28% strength in water) were uniformly metered in over the course of 2 hours. The reaction mixture was then stirred for a further 1 hour at 75° C. and then brought to room temperature. At room temperature, 0.23 g of a 4% strength solution of [EDTA-Fe]K (CAS No. 54959-35-2) and 9.2 g of a 5% strength hydrogen peroxide solution were added, and 69 g of a 1% strength ascorbic acid solution was metered in uniformly over the course of 30 min. This gave an aqueous polymer dispersion with 31% solids content.

To characterize the dispersion, the following values were measured:

Solids Content:

The dispersion was dried at 140° C. for 30 min and the solids content was determined in percent from the ratio of dry residue to initial weight.

Particle Size:

The dispersion was diluted to 0.01% and the particle size was measured by means of light scattering in the High Performance Particle Sizer 5001 (HPPS) from Malvern Instruments.

LD Value:

The dispersion was diluted to 0.01% and the light transmission (LT) of the dispersion compared to pure water was measured visually in the Hach DR/2010 as a measure of the particle size.

The results are summarized in table 2.

Example 15

In a stirred apparatus consisting of a 4 liter HWS vessel with anchor stirrer (150 rpm), reflux condenser, internal thermosensor and metering station, 484.5 g of demineralized water (DM water) and 4.11 g of an emulsifier 28% strength (sodium lauryl ether sulfate; 28% strength in water) in water were mixed as initial charge.

At 75° C., 12.49 g of a 7% strength aqueous sodium peroxodisulfate solution were added to this solution and the mixture was stirred at 75° C. for 5 minutes. Then, at 75° C. and with further stirring, the emulsion consisting of 429.91 g of completely demineralized water (DM water), the monomers 140.82 g of methacrylic acid, 149.94 g of ethyl acrylate, 159.56 g of n-butyl acrylate and 12.5 g of the associative monomer M1 according to the invention and 20.54 g of sodium lauryl ether sulfate (28% strength in water) were metered in uniformly over the course of 2 hours. The reaction mixture was then stirred for a further 1 hour at 75° C. and then brought to room temperature. At room temperature, 0.23 g of a 4% strength solution of [EDTA-Fe]K (CAS No. 54959-35-2) and 9.2 g of a 5% strength hydrogen peroxide solution were added, and 69 g of a 1% strength ascorbic acid solution were metered in uniformly over the course of 30 min. This gave an aqueous polymer dispersion with 31% solids content.

The dispersion was characterized as described above. The results are summarized in table 2.

Examples 16 to 21

Further dispersions were prepared analogously to the procedure of example 15, except in each case the hydrophobically associating monomer M1 was replaced by another monomer M2 to M7. The dispersions were in each case characterized as described above. The results are summarized in each case in table 2.

TABLE 2

Data of the resulting dispersions

| Co-polymer No. | Hydro-phobically associating monomer | Number of EO units | Number of pentene oxide units | Solids content (%) | Particle size (nm) | LT—0.1% strength (%) |
|---|---|---|---|---|---|---|
| C 7 | without | | | | | |
| 15 | M1 | 22 | 8 | 31.1 | 76 | 97 |
| 16 | M7 | 132 | 8 | 31.0 | 65 | 98 |
| 17 | M5 | 68 | 8 | 30.8 | 63 | 98 |
| 18 | M6 | 68 | 12 | 30.3 | 63 | 98 |
| 19 | M2 | 22 | 12 | 31.0 | 64 | 98 |
| 20 | M3 | 22 | 16 | 30.8 | 66 | 98 |
| 21 | M4 | 22 | 20 | 30.8 | 63 | 98 |

PART C) APPLICATIONS-RELATED TESTS

Part C-1) Test of the Copolymers of the Type A1

Determination of the Gel Fraction:

1 g of the respective copolymer is stirred in 249 g of synthetic seawater in accordance with DIN 50900 for 24 h until completely dissolved. The solution is then filtered over a 200 μm sieve and the volume of the residue remaining on the sieve is measured. This value is the gel fraction.

Determination of the Viscosity:

The viscosity of the filtrate is measured using a rheometer with double-slit geometry at 7 s$^{-1}$ and 60° C.

The results are summarized in tables 3 and 4.

TABLE 3

Results of the applications-related experiments with amphoteric copolymers of the type (A1)

| Copolymer | Hydrophobically associating monomer | Gel fraction [ml] | Viscosity [mPas] |
|---|---|---|---|
| Example 1 | M1 | <5 | 25 |
| C1 | without | <5 | 10 |
| C2 | M8 | 8 | 16 |
| C3 | M9 | 9 | 12 |

TABLE 4

Results of the applications-related experiments with copolymers of the type (A1) of acrylamide and AMPS

| Copolymer | Monomer used | Number of EO units | Number of pentene oxide units | Viscosity [mPas] |
|---|---|---|---|---|
| Example 2 | M1 | 22 | 8 | 27 |
| Example 3 | M2 | 22 | 12 | 52 |
| Example 4 | M3 | 22 | 16 | 9 |
| Example 5 | M4 | 22 | 20 | 22 |
| Example 6 | M5 | 68 | 8 | 17 |
| Example 7 | M6 | 68 | 12 | 30 |
| Example 8 | M7 | 132 | 8 | 3 |

The data in table 3 show that the solution of the copolymer according to the invention according to example 1 in seawater has the highest viscosity of all of the tested copolymers for a simultaneously low gel fraction. The copolymer according to comparative example 1, thus without monomers which can hydrophobically associate, likewise has a low gel fraction, but the viscosity is also naturally lower. The monomers according to prior art M8 and M9 do increase the viscosity, as expected, but not as great by far as the monomers used according to the invention and, moreover, the gel fraction is in each case significantly higher.

Table 4 shows that the viscosity of the copolymers according to the invention depends on the nature of the monomers used. Example 3 represents the best currently known embodiment of the invention.

Part C-2) Test of the Copolymers of the Type (A2) and (A3)

Test in a Tile Adhesive Mortar:

The properties of the copolymers of the type (A2) were tested in a test mixture of a tile adhesive mortar. The composition of the test mixture is given in DE 10 2006 050 761 A1, page 11, table 1. This is a ready-to-use formulated dry mixture to which in each case 0.5% by weight of the hydrophobically associating copolymer to be tested was admixed in solid form. After the dry mixing, a certain amount of water was added and the mixture was intensively stirred using a suitable mixing device (drilling machine with G3 mixer). The required mixing time was measured. The tile adhesive was initially left to ripen for 5 min.

The following tests were carried out on the stirred tile adhesive mortar:

| | |
|---|---|
| Slump | The determination of the slump was carried out in accordance with DIN 18555, part 2 and was carried out directly after the ripening time and, if appropriate, at later time points. |
| Water retention | The water retention was ascertained 15 min after stirring in accordance with DIN 18555, part 7. |
| Wetting | The tile adhesive formulation was applied to a concrete slab in accordance with EN 1323 and after 10 min, a tile (5 cm × 5 cm) was laid onto it. The tile was then weighted with a weight of 2 kg for 30 s. After a further 60 min, the tile was removed and it was ascertained to what percentage the back of the tile was still adhered to by tile mortar. |
| Slip | The slip was determined 3 min after stirring in accordance with DIN EN 1308. The slip distance in mm is stated. |
| Tack | The determination of the tack and/or ease of handling of the test mixture was carried out by a qualified person skilled in the art. |
| Air pore stability | The determination of the air pore stability was carried out visually by a qualified person skilled in the art. |

The copolymers used in each case and the results obtained are summarized in table 5.

Test in a Self-Compacting Concrete

The properties of the copolymers of the type (A3) were tested in a test mixture of a self-compacting concrete. The composition of the test mixture is given in DE 10 2004 032 304 A1, page 23, table 11. The polymers to be tested are used in each case in an amount of 0.02% by weight.

The preparation of the mortar mixtures was carried out in accordance with section [0105] of DE 10 2004 032 304 A1, the determination of the flowability (slump flow) was carried out in accordance with the method described in section [0106], and the bleeding and the sedimentation were assessed visually by a person skilled in the art. The values were taken directly after stirring and after 20 minutes.

The copolymers used in each case and the results obtained are summarized in table 6.

TABLE 5

Results of the examples and comparative examples

| | Copolymer | | | | | | | |
|---|---|---|---|---|---|---|---|---|
| | Example 6 | Example 9 | Example 10 | Example 11 | Example 12 | C4 | C5 | C6 Cellulose ether MHPC 30 000 |
| Mixing time [s] | 16 | 18 | 20 | 15 | 12 | 16 | 18 | 6 |
| Slump | 19.0 | 18.4 | 18.3 | 20.5 | 18.1 | 17.2 | 18.2 | 16.2 |
| Water retention [%] | 98.0 | 98.1 | 98.0 | 97.7 | 98.0 | 97.8 | 98.1 | 98.6 |
| Wetting [%] | 88.2 | 95 | 87 | 90 | 93 | 89 | 91 | 70 |
| Slip [mm] | 3 | 2 | 1 | 5 | 2 | 2 | 3 | 8 |
| Tack | good | high | high | good | high | high | high | very high |
| Air pore stability | good | very good | very good | good | very good | good | very good | good |

TABLE 6

Results of the examples and comparative examples

| Copolymer | Example 8 | Example 13 | Example 14 | C7 Without polymer | C8 Polymer according to DE102004032304 A1 Example 8 |
|---|---|---|---|---|---|
| Slump (immediate) [cm] | 72.5 | 73 | 72 | 75 | 74 |
| Bleeding (immediate) | no | no | no | severe | no |
| Sedimentation (immediate) | no | no | no | severe | no |
| Slump (after 20 min) [cm] | 72 | 73 | 72 | 74 | 72 |
| Bleeding (after 20 min) | no | no | no | severe | no |
| Sedimentation (after 20 min) | no | no | no | severe | no |

Part C-3) Test of the Copolymers of the Type A4

Preparation of an Exemplary Liquid Detergent

The following stock formulations are prepared (% by weight, based on the finished formulation):

| Component | Amount |
|---|---|
| Anionic surfactant (linear alkylbenzene sulfonic acid, $C_{10-13}$) | 13.44 |
| Nonionic surfactant ($C_{13/15}$ oxo alcohol, alkoxylated with ca. 7 EO units) | 7.5 |
| Coconut oil fatty acid | 8.5 |
| KOH | 4.38 |
| Sodium citrate dihydrate | 3 |
| 1,2-Propylene glycol | 8 |
| Ethanol | 2 |
| Water | qs |

The above constituents were mixed and topped up to 90% by weight with water, i.e. a formulation gap of 10% by weight remained. The stock formulations were adjusted to pH 8.6 with KOH.

For the (unthickened) reference formulations, the stock formulations were topped up to 100% by weight with water. For the thickened test formulations, the stock formulations were topped up with thickener dispersion and water so that, taking into consideration the solids content of the dispersion, a thickener concentration of 1.4% by weight, based on the finished formulation, was established. Prior to the viscosity measurement, the formulations were left to stand for at least 5 hours.

The low-shear viscosity was measured taking into consideration the instructions in accordance with DIN 51550, DIN 53018, DIN 53019 using the Brookfield viscometer model RV-03 at a rotary speed of 20 revolutions per minute using spindle No. 62 at 20° C. The viscosity of the unthickened reference formulations was 112 mPas.

To quantify the transparency of the thickened formulations, the transmission in % was measured at 440 nm at 23° C. using a LICO 200 from Dr. Lange. The values found for the thickened formulations are given as a percentage, relative to the transmission of the unthickened reference formulation.

The results are summarized in tables 7.

TABLE 7

Applications-related evaluation of the thickener dispersions:
Formulation with 1.4% by weight thickener

| Polymer used according to | Transmission (%) | Low-shear viscosity (mPas) |
|---|---|---|
| Without thickening polymer | — | 112 |
| Comparative example 7 (without monomer (a)) | 99 | 1023 |
| Example 15 | 99 | 1392 |

TABLE 7-continued

Applications-related evaluation of the thickener dispersions:
Formulation with 1.4% by weight thickener

| Polymer used according to | Transmission (%) | Low-shear viscosity (mPas) |
|---|---|---|
| Example 16 | 100 | 1472 |
| Example 17 | 100 | 1392 |
| Example 18 | 100 | 1424 |
| Example 19 | 100 | 1360 |
| Example 20 | 100 | 1472 |
| Example 21 | 100 | 1408 |

It can be seen that the use of the thickeners leads to a considerable viscosity increase compared to the reference formulation without thickener.

Examples 15 to 21 which comprise the hydrophobically associating monomers according to the invention produce a significantly higher viscosity than comparison sample 7 which does not comprise any hydrophobically associating monomer. The use of the associative monomers according to the invention does not adversely effect the high transparency of the liquid detergent formulation, expressed by the transmission measurement.

The invention claimed is:

1. An additive for aqueous construction systems which comprise a water-soluble, hydrophobically associating copolymer comprising at least
   (a) 0.1 to 20% by weight of at least one monoethylenically unsaturated, hydrophobically associating monomer (a), and
   (b) 25% by weight to 99.9% by weight of at least one monoethylenically unsaturated hydrophilic monomer (b) different therefrom,
   where the quantitative data are based in each case on the total amount of all of the monomers in the copolymer, wherein at least one of the monomers (a) is a monomer of the general formula (I)

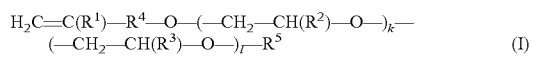

where the units —(—CH$_2$—CH(R$^2$)—O—)$_k$ and —(—CH$_2$—CH(R$^3$)—O—)$_l$ are arranged in block structure in the order shown in formula (I) and the radicals and indices have the following meaning:
   k: a number from 10 to 150,
   l: a number from 5 to 25,
   R$^1$: H or methyl,
   R$^2$: independently of one another, H, methyl or ethyl, with the proviso that at least 50 mol % of the radicals R$^2$ are H,
   R$^3$: independently of one another, a hydrocarbon radical having at least 2 carbon atoms or an ether group of the general formula —CH$_2$—O—R$^{2'}$, where R$^{2'}$ is a hydrocarbon radical having at least 2 carbon atoms,
   R$^4$: a single bond or a divalent linking group selected from the group of —(C$_n$H$_{2n}$)—, —O—(C$_{n'}$H$_{2n'}$)— and —C(O)—O—(C$_{n''}$H$_{2n''}$)—, where n, n' and n" is in each case a natural number from 1 to 6,
   R$^5$: H or a hydrocarbon radical having 1 to 30 carbon atoms.

2. The additive according to claim 1, wherein R$^3$ is a hydrocarbon radical having at least 3 carbon atoms.

3. The additive according to claim 1, wherein R$^1$ is H and R$^4$ is a group selected from —CH$_2$— or —O—CH$_2$—CH$_2$—CH$_2$—CH$_2$—.

4. The additive according to claim 1, wherein R$^5$ is H.

5. The additive according to claim 1, wherein at least one of the monomers (b) is a monomer comprising acid groups or salts thereof.

6. The additive according to claim 5, wherein the acidic groups are at least one group selected from the group of —COOH, —SO$_3$H and —PO$_3$H$_2$ or salts thereof.

7. The additive according to claim 1, wherein the copolymer comprises at least two different hydrophilic monomers (b), and these are at least
   one neutral hydrophilic monomer (b1), and
   at least one hydrophilic anionic monomer (b2) which comprises at least one acid group selected from the group of —COOH, —SO$_3$H or —PO$_3$H$_2$ or salts thereof,
   where the amount of the monomers (a) is 0.1 to 12% by weight and that of all the monomers (b) together is 70 to 99.5% by weight with regard to the amount of all of the monomers in the copolymer.

8. The additive according to claim 7, wherein the neutral monomer (b1) is a monomer (meth)acrylamide, N-methyl(meth)acrylamide, N,N'-dimethyl(meth)acrylamide, N-methylol(meth)acrylamide or N-vinyl-2-pyrrolidone, and the monomer (b2) is at least one selected from the group of (meth)acrylic acid, vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid and vinylphosphonic acid.

9. The additive according to claim 7, wherein the copolymer further comprises at least one cationic monomer (b3) having ammonium groups.

10. The additive according to claim 9, wherein the cationic monomer is salts of 3-trimethylammonium propyl(meth)acrylamides or 2-trimethylammonium ethyl(meth)acrylates.

11. The additive according to claim 7, wherein the amount of the monomers (a) is 0.1 to 5% by weight with regard to the amount of all of the monomers in the copolymer.

12. The additive according to claim 1, wherein the copolymer comprises at least two different hydrophilic monomers (b), and these are at least
    one neutral hydrophilic monomer (b1), and
    at least one cationic monomer (b3),
    where the amount of the monomers (a) is 0.1 to 12% by weight and that of all the monomers (b) together is 70 to 99.9% by weight with regard to the amount of all of the monomers in the copolymer.

13. The additive according to claim 1, wherein the copolymer comprises at least two different hydrophilic monomers (b), and these are at least
    5 to 50% by weight of at least one neutral hydrophilic monomer (b1), and
    25 to 94.9% by weight of at least one anionic monomer (b2) comprising sulfonic acid groups,
    where the amount of the monomers (a) is 0.1 to 12% by weight, and that of all the monomers (b) together is 70 to 99.9% by weight with regard to the amount of all of the monomers in the copolymer.

14. The additive according to claim 12, wherein the copolymer comprises, as monomer (a), additionally at least one monomer of the general formulae

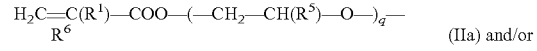

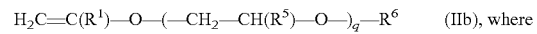

R$^1$ is H or methyl,
   q is a number from 10 to 150,
   R$^5$, independently of one another, are H, methyl or ethyl, where at least 50 mol % of the radicals R$^5$ are H, and
   R$^6$ is an aliphatic and/or aromatic, straight-chain or branched hydrocarbon radical having 6 to 40 carbon atoms,
   with the proviso that at least 0.1% by weight of the monomers (a) of the formula (I) are used, and furthermore at least 25% by weight of the amount of all of the monomers (a) are monomers of the formula (I).

15. The additive according to claim 12, wherein the copolymer also comprises up to 1% by weight of a crosslinking monomer (d) comprising at least two ethylenically unsaturated groups, where monomer (d) is at least one selected from the group of 1,4-butanediol di(meth)acrylate, 1,6-hexanediol di(meth)acrylate, 1,3-butylene glycol di(meth)acrylate, neopentyl glycol di(meth)acrylate, ethylene glycol di(meth)acrylate, diethylene glycol di(meth)acrylate, triethylene glycol di(meth)acrylate or oligoethylene glycol di(meth)acrylates such as, for example, polyethylene glycol bis(meth)acrylate, N,N'-methylenebis(meth)acrylamide, ethylene glycol divinyl ether, triethylene glycol divinyl ether, triallylamine, triallylamine methammonium chloride, tetraallylammonium chloride and tris(2-hydroxy)isocyanurate tri(meth)acrylate.

16. A hydraulic binder system which comprises the additive as claimed in claim 1 and wherein the binder is cement, lime, gypsum or anhydrite.

17. A nonflowable construction system which comprises the additive as claimed in claim 1 wherein the nonflowable construction system is tile adhesives, plasters or gap fillers, and flowable construction systems selected from the group of self-leveling floor screeds, sealing and repair mortars, flow screeds, flow concrete, self-compacting concrete, underwater concrete or underwater mortar.

18. The nonflowable construction system according to claim 17, wherein the amounts of the copolymers are between 0.001 and 5% by weight, based on the dry weight of the construction system.

19. The additive according to claim 1, wherein the copolymer is used in combination with nonionic polysaccharide derivatives selected from the group of methylcellulose (MC), hydroxyethylcellulose (HEC), hydroxypropylcellulose (HPC), methylhydroxyethylcellulose (MHEC), methylhydroxypropylcellulose (MHPC) and also Welan gum or Diutan gum.

* * * * *